US011422583B2

United States Patent
Nernberger et al.

(10) Patent No.: US 11,422,583 B2
(45) Date of Patent: Aug. 23, 2022

(54) TOASTER OVEN WITH TACTILE FEEDBACK CONTROL

(71) Applicant: Spectrum Brands, Inc., Middleton, WI (US)

(72) Inventors: Kroy Everett Nernberger, Madison, WI (US); Peter Alan Steiner, Madison, WI (US); Jacob Daniel Smith, Monona, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 17/307,385

(22) Filed: May 4, 2021

(65) Prior Publication Data
US 2021/0349493 A1 Nov. 11, 2021

Related U.S. Application Data

(60) Provisional application No. 63/020,214, filed on May 5, 2020.

(51) Int. Cl.
*G05G 1/10* (2006.01)
*G05G 5/03* (2008.04)
*A47J 37/06* (2006.01)

(52) U.S. Cl.
CPC ............ *G05G 5/03* (2013.01); *A47J 37/0623* (2013.01); *G05G 1/10* (2013.01)

(58) Field of Classification Search
None
See application file for complete search history.

(56) References Cited

U.S. PATENT DOCUMENTS

| 3,684,861 | A | 8/1972 | De Remer |
| 3,694,602 | A | 9/1972 | Iwasaki |
| 3,770,926 | A | 11/1973 | Wanner |
| 4,059,738 | A | 11/1977 | Mongeau |
| 4,300,525 | A | 11/1981 | Delgado et al. |
| 4,587,389 | A | 5/1986 | Willigman |
| 5,771,878 | A | 6/1998 | Lewis et al. |
| 7,902,476 | B2 | 3/2011 | Andueza et al. |
| 8,173,924 | B2 | 5/2012 | Tegel et al. |

(Continued)

FOREIGN PATENT DOCUMENTS

| CN | 10749583 A | 12/2017 |
| KR | 1020010026758 A | 4/2001 |

OTHER PUBLICATIONS

International Search Report for co-pending PCT/US2021/030649 5 pages, dated Aug. 30, 2021.

*Primary Examiner* — Richard W Ridley
*Assistant Examiner* — Brian J Mcgovern
(74) *Attorney, Agent, or Firm* — Kagan Binder, PLLC

(57) ABSTRACT

Embodiments of a heating appliance with control features such as knobs can provide tactile feedback to the user during knob operation. Tactile feedback through the knob, e.g., during rotation in one or more directions, can improve control precision. Beneficial control accuracy features, such as can be utilized during appliance operation and setting of parameters of the heating appliance. A user's desired setting, such as various cooking modes or an off position can therefore be input into the heating appliance with tactile control aspects. A user's desired setting can therefore be accurately set, including with the benefit of tactile control aspects.

24 Claims, 28 Drawing Sheets

(56) References Cited

U.S. PATENT DOCUMENTS

| | | | |
|---|---|---|---|
| 8,434,199 | B1 | 5/2013 | Bowen et al. |
| D722,815 | S | 2/2015 | Fuller et al. |
| 8,967,019 | B2 | 3/2015 | O'Keefe et al. |
| 10,051,996 | B2 | 8/2018 | Starr |
| 10,327,591 | B2 | 6/2019 | Starr |
| 2003/0154970 | A1* | 8/2003 | Huang .................... F23N 5/203 126/39 N |
| 2015/0276230 | A1* | 10/2015 | Chen ...................... G04C 23/10 137/624.12 |
| 2017/0059173 | A1* | 3/2017 | Starr ...................... G05G 1/082 |
| 2017/0060170 | A1* | 3/2017 | Starr ................... A47J 37/0814 |
| 2017/0162347 | A1* | 6/2017 | Harazawa ................ G05G 1/08 |
| 2019/0155324 | A1 | 5/2019 | Wang et al. |
| 2019/0170362 | A1 | 6/2019 | Morton et al. |
| 2019/0264924 | A1 | 8/2019 | Wang et al. |
| 2020/0149745 | A1* | 5/2020 | Kim ........................ G05G 5/03 |

* cited by examiner

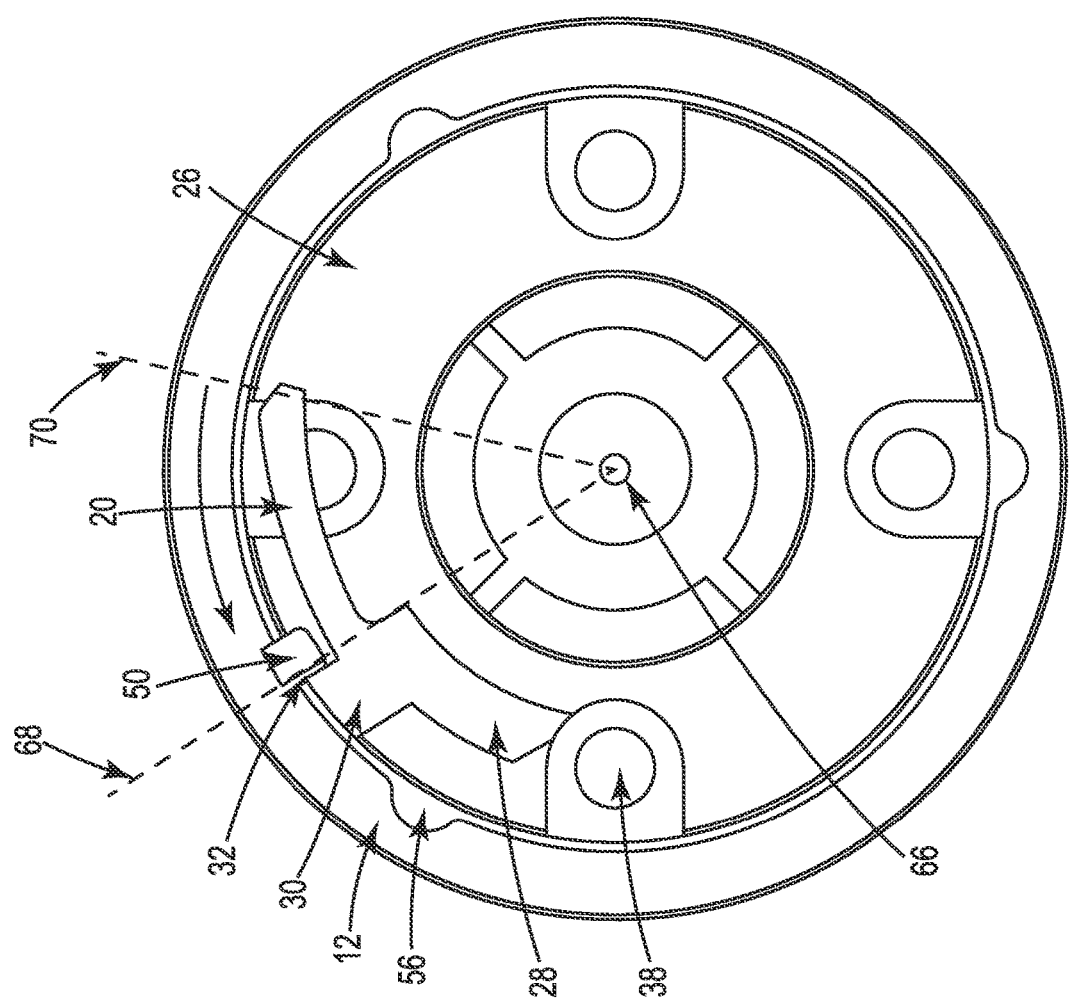

KNOB RESISTANCE TORQUE TESTING DATA

| STAY-ON FUNCTION (PRIOR ART) | |
|---|---|
| TURNING ON | TURNING OFF |
| TORQUE (IN-OZ) | |
| 52.3 | 22.6 |
| 51.3 | 21.9 |
| 53.2 | 22.3 |
| 51.6 | 22.1 |
| 49.1 | 22.3 |
| AVG. 51.5 | 22.2 |

Fig. 14

| STAY-ON FUNCTION (EXAMPLE FROM PRESENT DISCLOSURE) | |
|---|---|
| TURNING ON | TURNING OFF |
| TORQUE (IN-OZ) | |
| 88.3 | 31.4 |
| 80.9 | 30.9 |
| 86.8 | 31.3 |
| 95.5 | 32.2 |
| 79.1 | 30.9 |
| AVG. 86.1 | 31.3 |

Fig. 15

| TIMER FUNCTION | |
|---|---|
| TURNING ON | TURNING OFF |
| TORQUE (IN-OZ) | |
| 26.9 | 42.3 |
| 27 | 44.3 |
| 27.8 | 42 |
| 28.9 | 41.2 |
| 28.4 | 43 |
| 27.4 | 43.5 |
| AVG. 27.7 | 42.7 |

Fig. 16

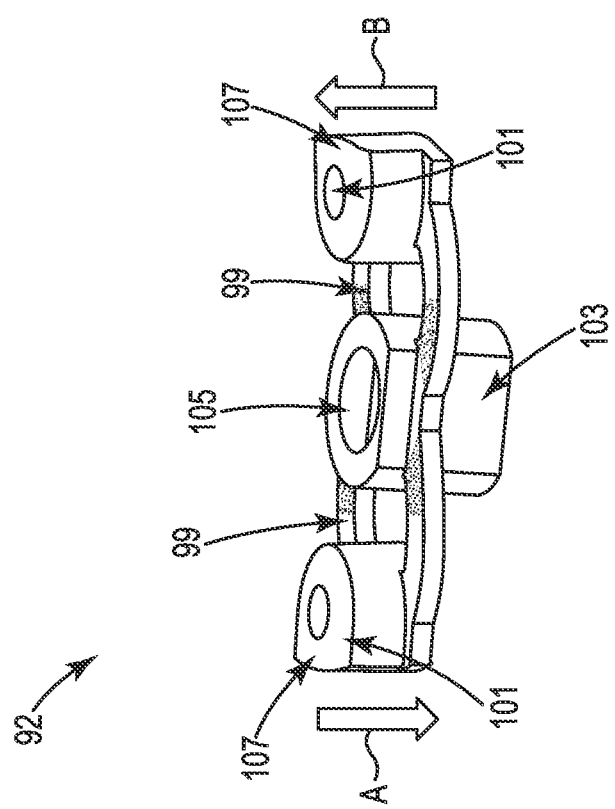
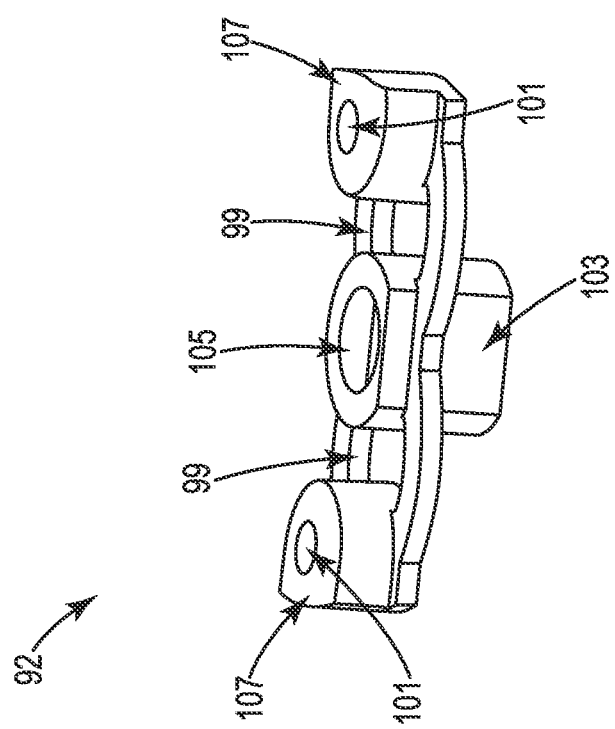

TOASTER OVEN WITH TACTILE FEEDBACK CONTROL

CROSS REFERENCE TO RELATED APPLICATIONS

This application claims priority to and the benefit of U.S. Provisional Patent Application No. 63/020,214, filed May 5, 2020, the entire contents of which are incorporated herein by reference in their entireties.

BACKGROUND

The present invention relates generally to appliances and, more particularly, to an appliance for heating a food product.

Many known heating appliances such as toaster ovens have heating elements and a rack mounted within a cavity for heating a food product placed on the rack. A door provides access to the cavity of the appliance for placing the food product on the rack, and a user-interface provides a user with control over the temperature within the cavity and the duration for which the food product is heated. Controls can include one or more knobs that are used to adjust heating temperature, time, and/or cooking modes.

A control often comprises a rotatable knob, the rotation of which can select cooking modes and/or a cooking time. Typically, such a control knob after set to a cooking time rotates back to an off position as the time counts down. A user may choose to end a cooking cycle prior to the time counting down and expiring. The user would manually rotate the control knob to the off position. Other cooking modes are often provided for by a rotation of the control knob past the off position. Inadvertent overturning of the control knob could activate a cooking mode such as an always-on mode.

SUMMARY

The methods and features described herein are applicable to an improved heating appliance, such as a toaster oven, with tactile feedback control. Aspects of the invention described herein are directed to an improved control arrangement for use with a heating appliance with tactile interaction and feedback for a user when adjusting a setting or cooking mode of the heating appliance using one or more knobs.

As described herein, tactile feedback control can provide various benefits when a user is controlling the heating appliance. Embodiments provide tactile feedback to the user during knob operation. Tactile feedback through the knob, e.g., during rotation in one or more directions, can improve control precision. Beneficial control accuracy features as therefore described herein, such as can be utilized during appliance operation and setting of parameters of the heating appliance. A user's desired setting, such as various cooking modes or an off position can therefore be input into the heating appliance with tactile control aspects. A user's desired setting can therefore be accurately set, including with the benefit of tactile control aspects.

More specifically, the present disclosure describes improved control knob assemblies with multiple cooking positions and having corresponding interface portions on a control knob and a control module. It is generally preferable for a user to only select an "always-on" cooking mode for a heating appliance when expressly intended in order to achieve an appliance that is only heated when desired by a user. A timing parameter of an appliance can be set at a control module, which tracks a user set rotational knob position. The control module also defines a rotational knob position for a cooking mode, such as the always-on mode. As described herein, a flexible aspect and corresponding protrusion can be arranged to rotationally interact so that the protrusion abuts the flexible aspect at the off position and causes the flexible aspect to flex in order to move the control knob to one or more cooking modes with tactile feedback received by the user as the cooking mode is changed or the knob position is rotated. Cooking modes can include an off position, an always-on position, and various timed positions according to a user parameter input.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein:

FIG. 13 is a front view of the control mechanism interface portion of FIG. 7 and the control knob of FIG. 8 as the protrusion reaches a second cooking mode position, according to various embodiments.

FIG. 14 shows testing data for a knob resistance torque of an always-on function when turning a prior art heating appliance on or off.

FIG. 15 shows testing data for a knob resistance torque of an always-on function when turning a heating appliance on or off, according to various embodiments.

FIG. 16 shows testing data for knob resistance torque of a timer function when turning the heating appliance on or off, according to various embodiments.

FIG. 29 is a perspective view of the flexible adapter of FIG. 27, showing the flexible adapter in the resting position, according to various embodiments.

FIG. 30 is a perspective view of the flexible adapter of FIG. 28, showing the flexible adapter in the pivoted position, according to various embodiments.

DETAILED DESCRIPTION

Figure 1:
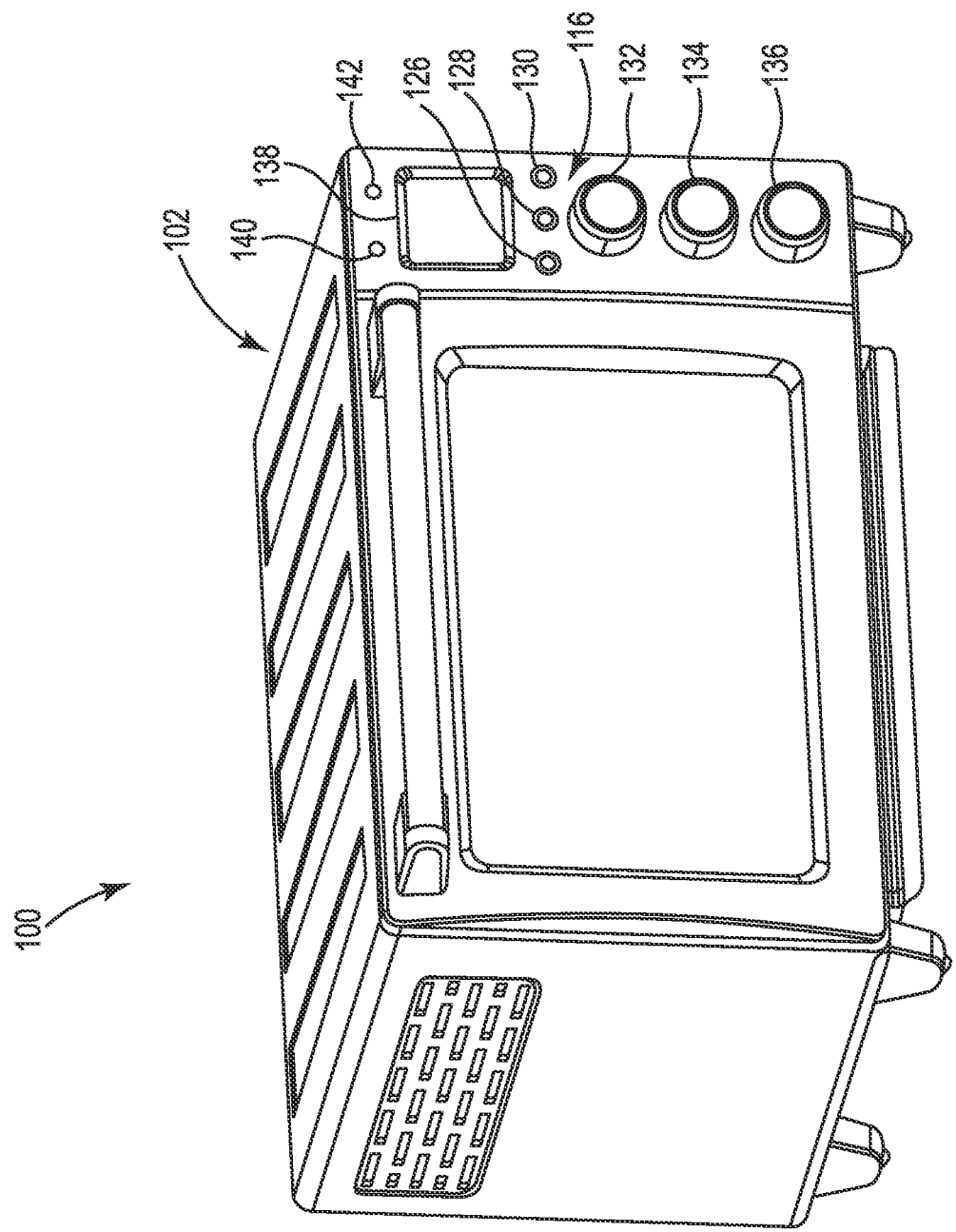
FIG. 1 is a perspective view of one embodiment of a heating appliance.

Referring now to the drawings, and initially to FIG. 1, a heating appliance (e.g., a toaster oven) is indicated generally by the reference numeral 100. The illustrated heating appliance 100 comprises a housing (indicated generally at 102).

The housing 102 defines a food product compartment, and one or more heating assemblies are disposed within the compartment for heating a food product on a rack. The appliance 100 can also comprise a fan (not shown) that is positioned in flow communication with the compartment via at least one vent such that, when operated, the fan circulates air through the compartment. Moreover, the appliance 100 further comprises a user-interface (indicated generally at 116) of a control module (e.g., control module 210 of FIG. 2), and the user-interface 116 is accessible on the exterior of the housing 102 for interacting with the control unit of the appliance 100. The control module can also be a control unit, and is configured for operating the heating assemblies of the appliance 100. One example of the control module is the control module 210, as shown and described with reference to FIG. 2, below.

As shown in FIG. 1, the user-interface 116 permits a user to input a variety of cooking settings into the appliance 100, so as to provide the control unit with user parameters on operating the heating elements and, thereby, cooking the food product. In the exemplary embodiment, the user-interface 116 includes a first button 126, a second button 128, and a third button 130, and the user-interface 116 also includes one or more knobs, such as a first knob 132, a second knob 134, and a third knob 136.

Moreover, the user-interface 116 further optionally includes a display 138 and a pair of lights, namely a first (or "now preheating") light 140 and a second (or "now cooking") light 142. However, it is contemplated that the user-interface 116 may be any suitable type of interface, and the examples in the illustrated embodiment are not intended to be limiting on the types of user-interfaces that are possible. Rather, the user-interface 116 may include any combination of one or more buttons, knobs, dials, slides, switches, displays, lights, touchscreens/touch controls, voice controls, and/or gesture controls, and the like, which are contemplated herein for user-interface 116. The user-interface 116 facilitates enabling a user to operate the appliance 100 in various cooking modes as described herein. For example, in some embodiments, various remote user-interfaces are also contemplated for providing the control unit with instructions via the Internet of Things (IoT).

In preferred embodiments of the user interface 116 of the present disclosure, at least one knob is included. Various knobs of the appliance 100, such as first knob 132, second knob 134, and/or third knob 136 can be equipped with a first, timed cooking mode and a second, always-on cooking mode whereby the heating elements of appliance 100 can be set to remain energized until the knob(s) are reverted by the user to an off position. One or more of knobs 132, 134, and/or 136 of the appliance 100 are also preferably equipped with a tactile feedback to the user, such as can be used for adjusting cooking modes, timed settings, and/or for providing avoidance of unintentional heating of the appliance 100, among other features and functions.

Figure 2:
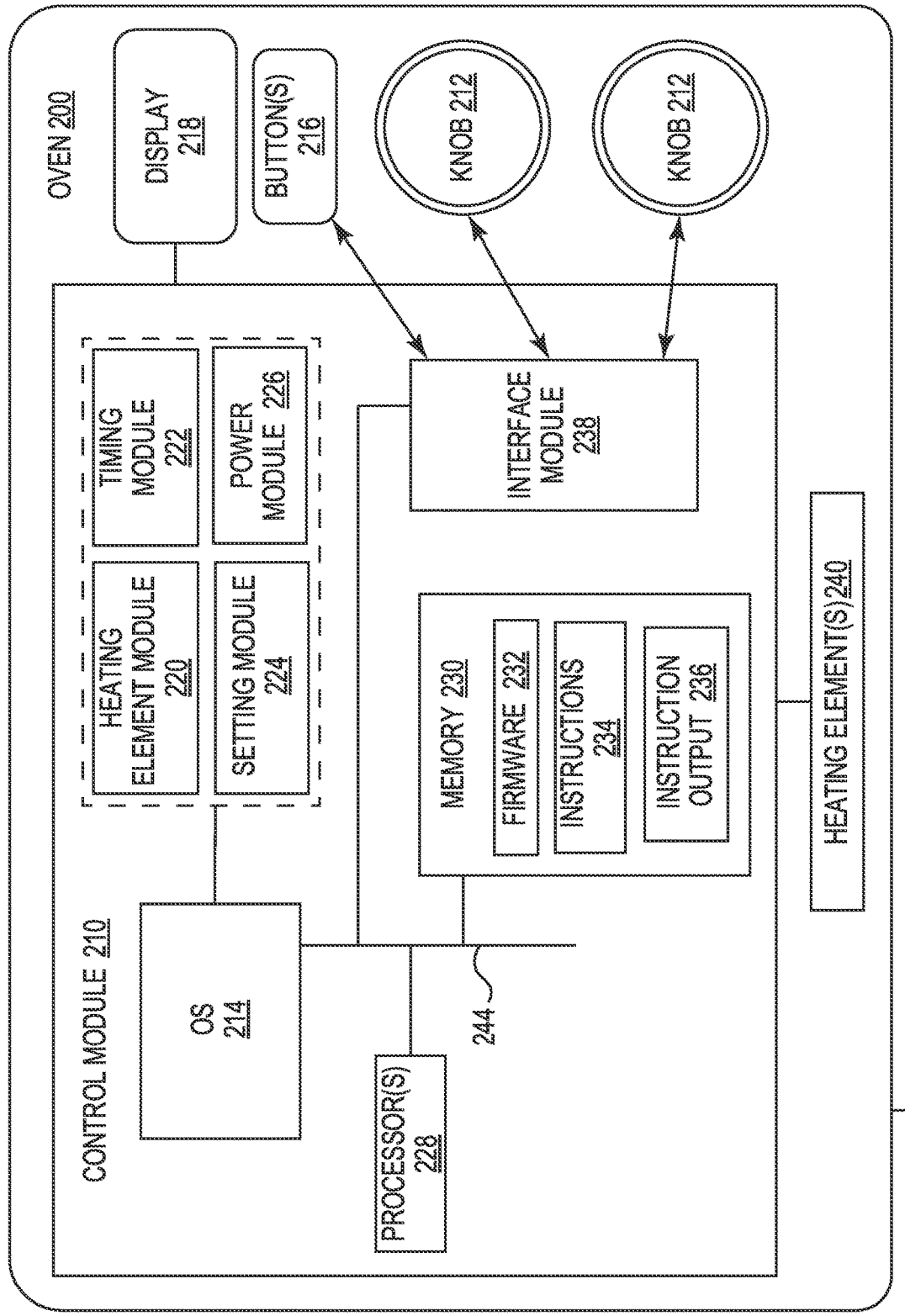
FIG. 2 is a schematic of an oven, which is an example of an appliance as described and used herein.

FIG. 2 is a schematic of an oven 200 equipped with knobs 212 having tactile feedback and control as described herein. The oven 200 is an example of an appliance as described and used herein. Oven 200 can be an example of appliance 100 of FIG. 1, according to various embodiments. Oven 200 can be a countertop oven, a wall oven, a pizza oven, a stand-alone oven or the like, or a toaster oven in some embodiments.

According to FIG. 2, the oven 200 comprises a control module 210 configured to provide an aspect of oven 200 control. Like the appliance 100 described above, the oven 200 also comprises a display 218, one or more buttons 216, one or more knobs 212, and one or more heating elements 240.

The control module 210 can include one or more control mechanisms with electronic and/or mechanical components, as described herein. The user interface 116 described with reference to FIG. 1 can include any or all of the display 218, the button(s) 216, and/or the knobs 212, as shown. The oven 200 can receive power, such as alternating current (AC) electrical power, from a power source 242, which can be any AC line current, for example. Alternatively, the power source 242 can provide direct current (DC) power, and can include batteries, capacitors, solar power, inductive power, and/or any other suitable power source.

The control module 210 preferably includes an operating system (OS) 214 stored thereon, one or more processor(s) 228, a memory 230, and an interface module 238. The OS 214 can further be configured to provide various functions to the control module 210, and the OS 214 can be configured to execute various programs, applications, routines, and/or processes using the processor(s) 228, memory 230, and/or interface module 238, including various functions embodied in various modules via an example controller bus 244. Various components of the oven 200 and/or control module can be operatively connected using any suitable interface such as direct or indirect connections, fabrics, networks, buses, and the like. Other and/or alternative modules having various functions can be included in control module 210. Examples of other modules contemplated include a heating element module 220, a timing module 222, a setting module 224, and a power module 226. The memory 230 is an example storage device or module that preferably comprises firmware 232, instructions 234 (e.g., for various cooking modes), and instruction output 236, any or all of which can be used in combination with the OS 214 and/or any other components of control module 210. All components and modules described herein can be "stand-alone" in nature, or can be integrated or combined with other modules and/or aspects.

As shown, the interface module 238 can be operatively connected to the buttons 216 and the knobs 212. The interface module 238 can also be operative connected to the display 218 in various embodiments, such as a touchscreen. The display 218 can comprise an input device in addition to a display in various embodiments, such as the example of the touchscreen above. The interface module 238 can communicate with and/or receive inputs from the button(s) 216, knobs 212, and/or display 218.

The control module 210 is configured to control one or more heating element(s) 240 of the oven 200. The heating elements 240 can include various resistive heating elements, or radiation elements such as quartz and halogen heating devices, or any other type of suitable heat producing feature. The control module 210 can control the heating elements 240 in terms of when the heating elements 240 are turned on, timing of heating, temperature of heating, type of heating, or any other heating aspect.

With reference now to FIGS. 3-13, a control knob assembly 10 is an example including one or more control knobs 12 (e.g., 212) in addition to other control aspects described herein. The control knob assembly 10 can comprise at least one knob 212 of oven 200, and can be used to at least in part provide a tactile feedback control feature to the oven 200. The tactile feedback control feature can include electronic and/or mechanical aspects in order to achieve suitable user-friendly tactile and/or control aspects, such as improved cooking mode selection. The control knob 12 can have a user manipulation feature configured to be tactile to a user's hand, for example. The manipulation feature of the control knob 12 can be configured such that a user can manipulate the control knob 12 for rotationally setting a timing parameter of a first cooking mode (e.g., a timed cooking mode) or for selecting the second cooking mode (e.g., the always-on cooking mode). In some embodiments, a rotation of the control knob 12 in a first direction (e.g., clockwise) increases a set value of the timing parameter, and a rotation in a second direction (e.g., counterclockwise) decreases the set value of the timing parameter until an off position is reached. Rotating in the second direction beyond the off position can engage an always-on cooking mode, for example.

Figure 3:
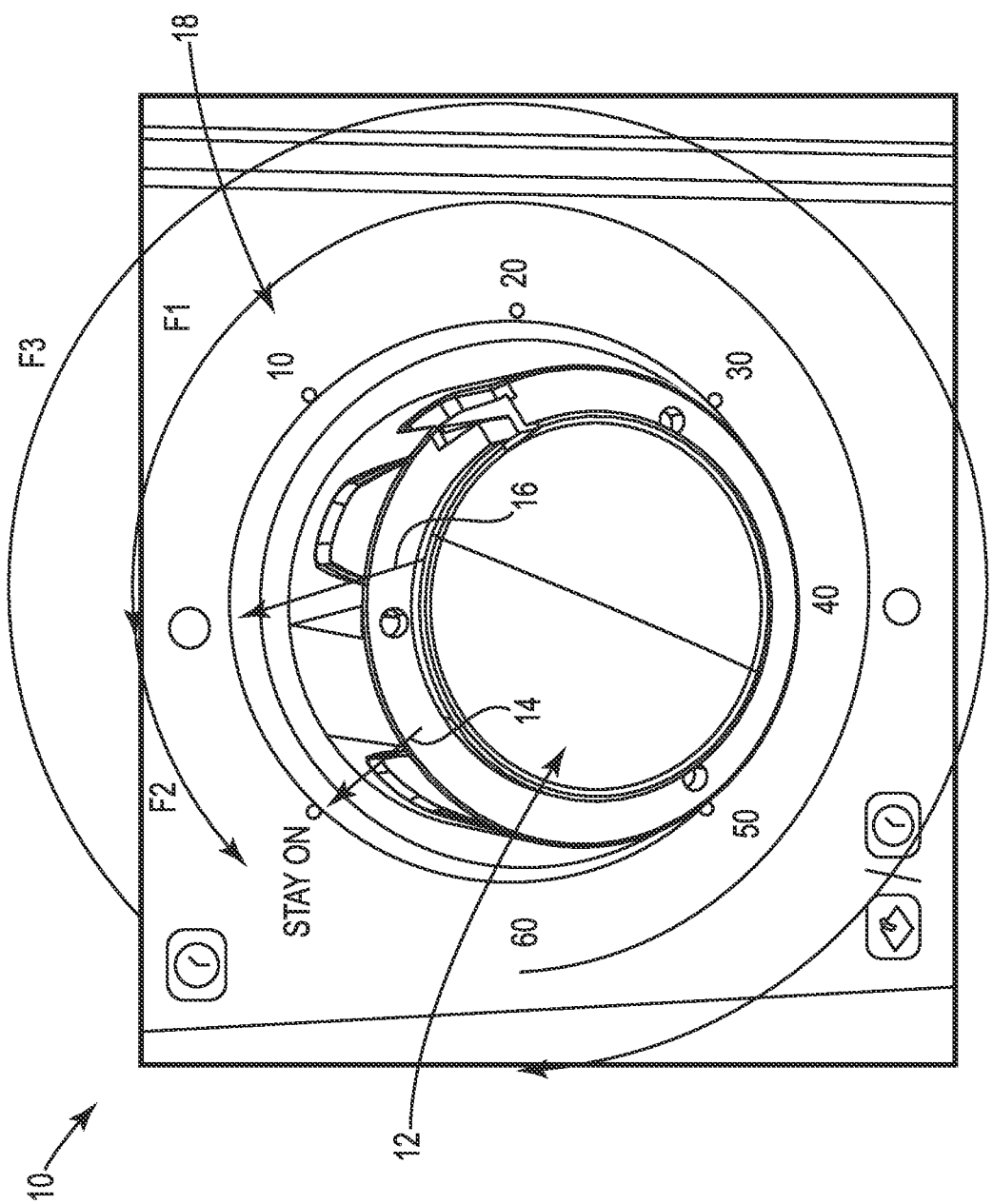
FIG. 3 is a perspective view of a control knob assembly for use with a heating appliance, according to various embodiments.

With reference now to FIG. 3, a control knob assembly 10 of an oven (e.g., oven 200 of FIG. 2) is shown with a control knob 12, and a position indicative feature (such as a dial) on housing 18, which includes at least a range of parameter positions (such as timer control for a timed cooking mode) and an always-on (e.g., stay on) position 14 and an off position 16. The position indicative feature, such as a dot, a line or an arrow head, can alternatively be on the knob 12 or any other component of the control knob assembly 10 or oven 200.

Various control knob adjustment rotational arcs are also illustrated, including timing parameter range arc F1, showing a control knob 12 rotational arc of counterclockwise (CCW) rotational movement from the an example maximum "60 minute" timed position to an off position 16, as shown. A user may desire to set an oven (e.g., oven 200) for a certain timed setting in order to heat a food item. At other times a user may wish to simply turn the oven on, such that the user can monitor the heating process and turn the oven off manually when desired. Arc F1 can represent a timed setting of 60 minutes set using control 12 and the arc of movement of the knob during the 60-minute timed period. The user can, however, rotate the knob 12 according to the arc F1 manually, thus bypassing a time period, such as 60-minutes, and returning the oven 200 to the off position 16. The off position 16 can correspond to a 0 time setting, which can be automatically returned to after a time expires for a timed cooking mode. Also, a temperature setting and/or a cooking mode or heating configuration can be separately selected by a user. An example oven can have a maximum timed setting of 60 minutes (as shown) or any other suitable maximum time. In the always-on setting, a maximum heating time can exceed a maximum timed setting in some embodiments.

In the illustrated embodiment, another example control knob arc, F2, shows an arc that does not overlap the arc F1, and extends CCW rotationally from the off position 16 to the always-on position 14. Passing from arc F1 to arc F2 can include passing a tactile feedback control aspect, which can include a resistive to rotational aspect that can provide tactile oven 200 improvements including avoidance of unintentional heating, improved cooking mode selection and precision, and/or unintended operation protection through tactile feedback control through the knob 12. The movement of the knob 12 according to the arc F2 represents a user intentionally rotating the knob to the selected mode (the always-on mode as shown). Preferably, this is done by overcoming a predetermined tactile force threshold of a control detent and positioning protrusion (of a knob interface portion 50) mechanical resistance as described in greater detail below.

A third control knob arc F3 shows a full range of clockwise (CW) rotational motion of the control knob from the always-on position 14 to the maximum "60 minute" timed position as indicated by the position indicative dial on housing 18. Therefore, the arc F3 indicates that a user desires to change the heating setting of the oven or appliance from the always-on setting to a (e.g., maximum) timed setting, of e.g., 60 minutes, after which the oven would shut off automatically. The various knob rotational arcs are merely examples of possible user adjustments (or timer-based movements) of the knob 12, which can be rotated in various other arcs, including in reversed rotational directions, according to other embodiments.

In some preferable embodiments, the maximum range of rotational movement range of the knob 12 in one direction is shown by arc F3, the rotational direction of which could also be reversed from CW to CCW in some embodiments. Additional tactile feedback can be received by the user when the knob 12 is attempted to be rotated beyond a maximum time in the CW direction, or beyond the always-on position 14 in the CCW direction. For example, a user may encounter a hard stop when attempting to rotation the knob 12 beyond a present range of knob 12 rotation shown by arc F3.

According to a preferred embodiment of the present disclosure, starting from the off position 16, it takes less force or torque to rotate the knob 12 in a first rotational direction (e.g., CCW) than in a second, reverse rotational direction (e.g., CW). This provides a tactile feedback to a user via the knob 12 of which mode is being selected. Likewise, when a user rotates the knob 12 to the off position 16, in one rotational direction, a tactile feedback indicates any attempt to rotate the knob 12. Specifically, a rotation in a first direction (e.g., CW) can require less force or torque and can begin a timed cooking mode, and rotation in a second direction (e.g., CCW) opposite the first direction can require a greater force or torque, and can set the oven 200 to an always-on mode. In this way, when starting from the off position 16, a user may be able to operate at least some aspect of the oven 200 in a tactile manner, without requiring the user looking directly at the knob 12, at least when initiating an initial adjustment of the knob 12. Therefore an unintentional rotation in a direction opposite a desired direction can beneficially be avoided according to various embodiments.

The knob 12 is preferably removable from the control knob assembly 10, but may not be removable in some embodiments. The knob 12 can be removably friction-fit to a shaft of a rotatably-driven component 22, as shown with reference to FIGS. 4 and 5. With the knob 12 removed (e.g., by a pulling outward force relative to the housing 18), various adjustment and tactile feedback control features are shown, with reference to FIGS. 4-13. An underside and interior of the removed knob 12 is shown in detail with reference to FIG. 8.

Figure 4:
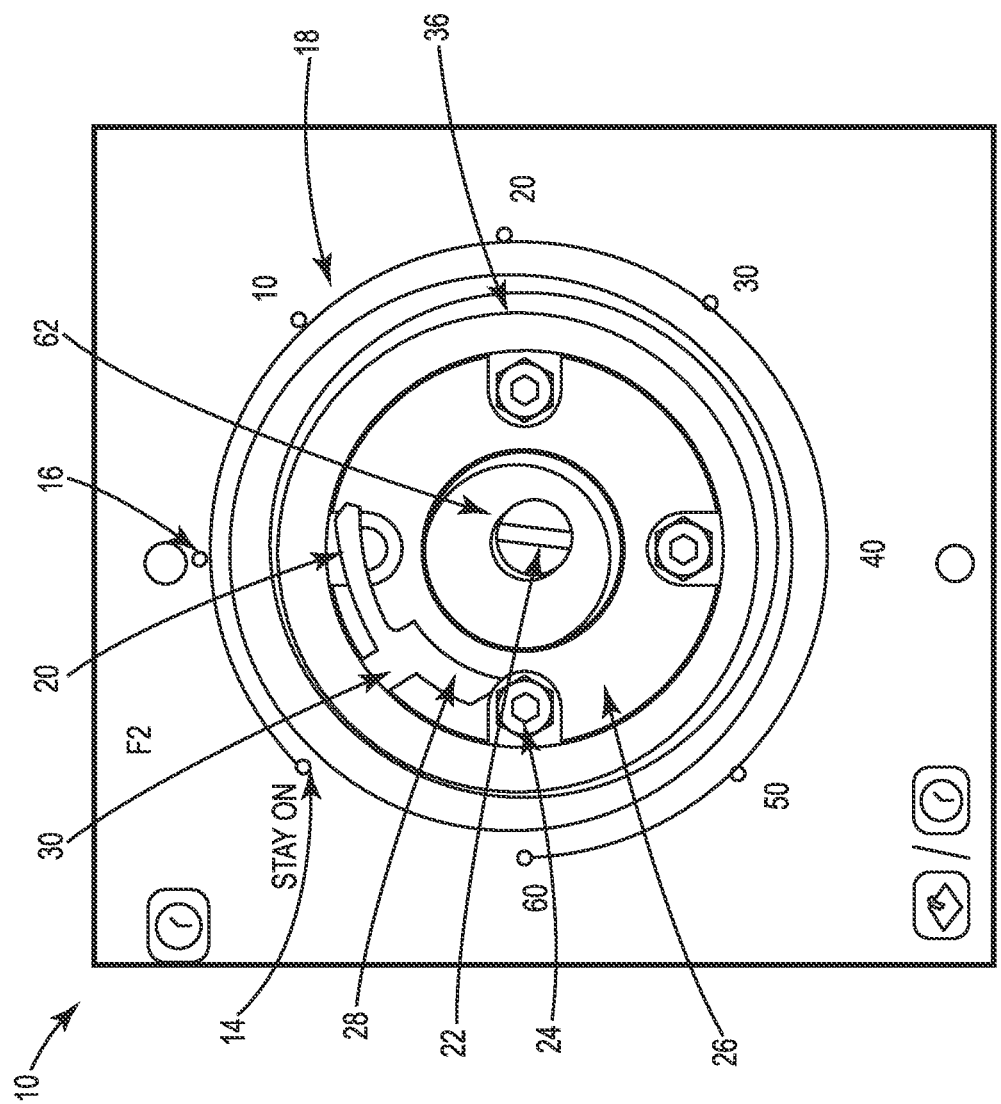
FIG. 4 is a perspective view of the control knob assembly of FIG. 3 with a control knob removed, according to various embodiments.
Figure 5:
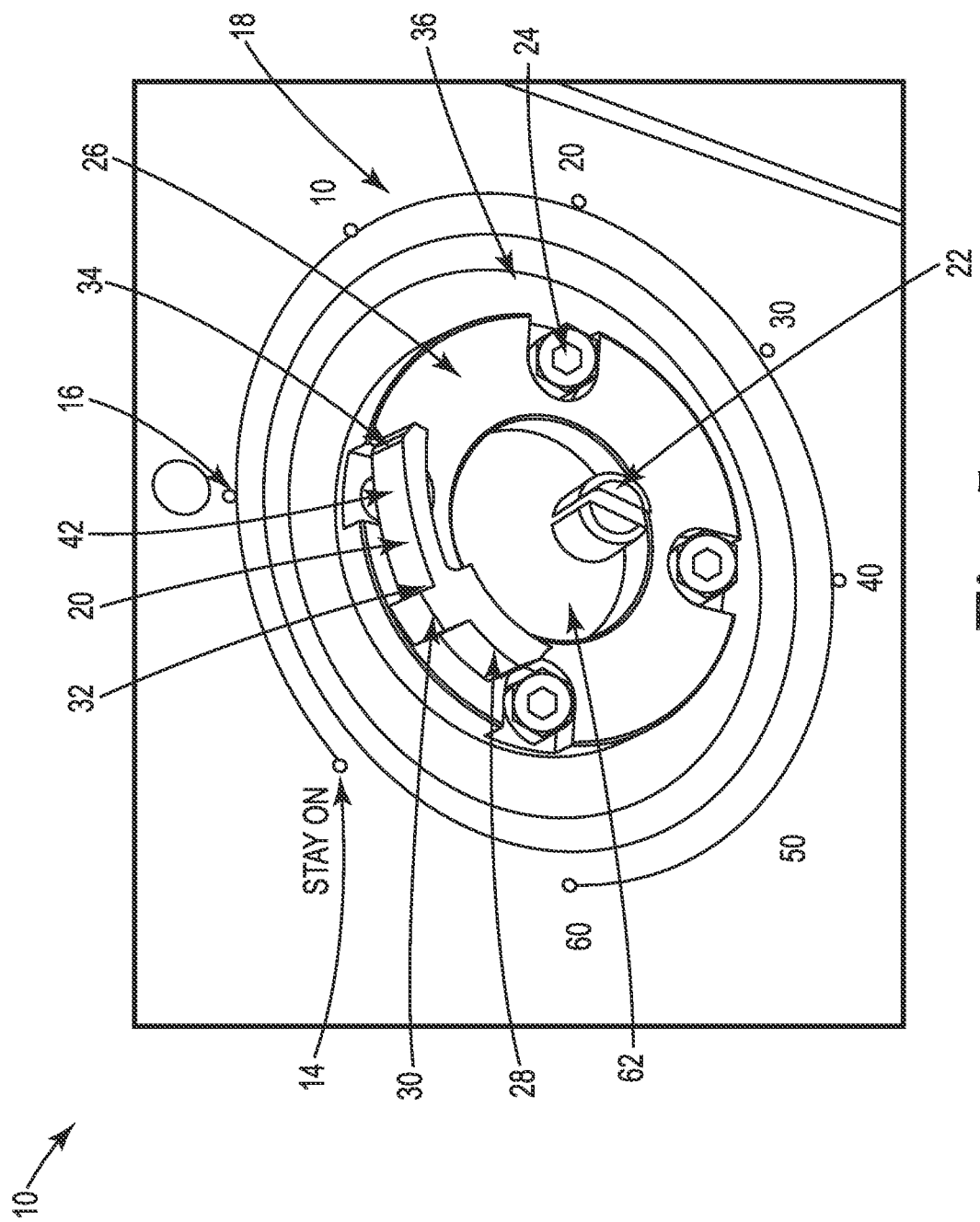
FIG. 5 is another perspective view of the control knob assembly of FIG. 3 with the control knob removed, according to various embodiments.

With reference to FIGS. 4 and 5, the control knob assembly 10 with knob 12 removed reveals a control mechanism interface portion 26 supported by housing 18 via one or more fasteners 24. A control mechanism 62, which preferably includes the rotatably-driven component 22, is also shown. The rotatably-driven component 22 can be operatively connected to an interface module (e.g., interface module 238 of FIG. 2) such that a first or second cooking mode or an off position 16 can be selected. Furthermore, the rotatably-driven component 22 can be mechanically connected to a timer drive or device configured to count down time until the control knob assembly 10 of an oven (e.g., oven 200) returns to the off positon, as is well known. The control mechanism interface portion 26 is preferably rotationally fixed in position to the housing 18 and includes a flexible detent 20 configured to interface with a knob interface portion 50 of rotatable control knob 12. The control mechanism interface portion 26 can be part of the control module 210, described herein. The control mechanism interface portion 26 can be a generally ring shaped unit configured to be mounted to the appliance housing 18 in various embodiments. The control mechanism interface portion 26 can also be referred to as a control module interface portion.

The knob interface portion 50 can comprise a positioning protrusion, which can include one or more operative surfaces 52 as shown and described with reference to FIG. 8. The protrusion rotates as connected with the knob interface portion 50. In various embodiments, the configuration, shape, size, and installed positioning of the fixed control mechanism interface portion 26 can be defined to set various oven control settings and positions relative to a given knob 12, including tactile aspects at various rotational arcs. Settings and positions can include always-on, off, and timed positions, and/or positions of tactile response, such as resistive to rotation and/or hard stop positions, among any others as suitable. The housing 18 can incorporate various timing parameter indications or hash marks as well as indications or graphics of the always-on and off positions, respectively. A maximum range of knob 12 rotation can also be shown on the housing 18, such maximum range preferably being defined by one or more tactile aspects and/or hard-stop features.

As shown, the control mechanism interface portion 26 is positioned adjacent to housing 18 of an oven (e.g., housing 102 of appliance 100) when in assembled positions. The control mechanism interface portion 26 is further attachable to the housing 18, such as via one or more fasteners 24 (e.g., screws), as shown with reference to FIGS. 4 and 5. The rotatably-driven component 22, when the control knob assembly 10 is assembled, passes through a center opening 40 of the control mechanism interface portion 26 (see FIG. 6). The rotatably-driven component 22 is configured to be rotatably-driven by the knob 12 when a user makes an adjustment by rotating the knob 12, or to be driven by a timer mechanism.

Figure 6:
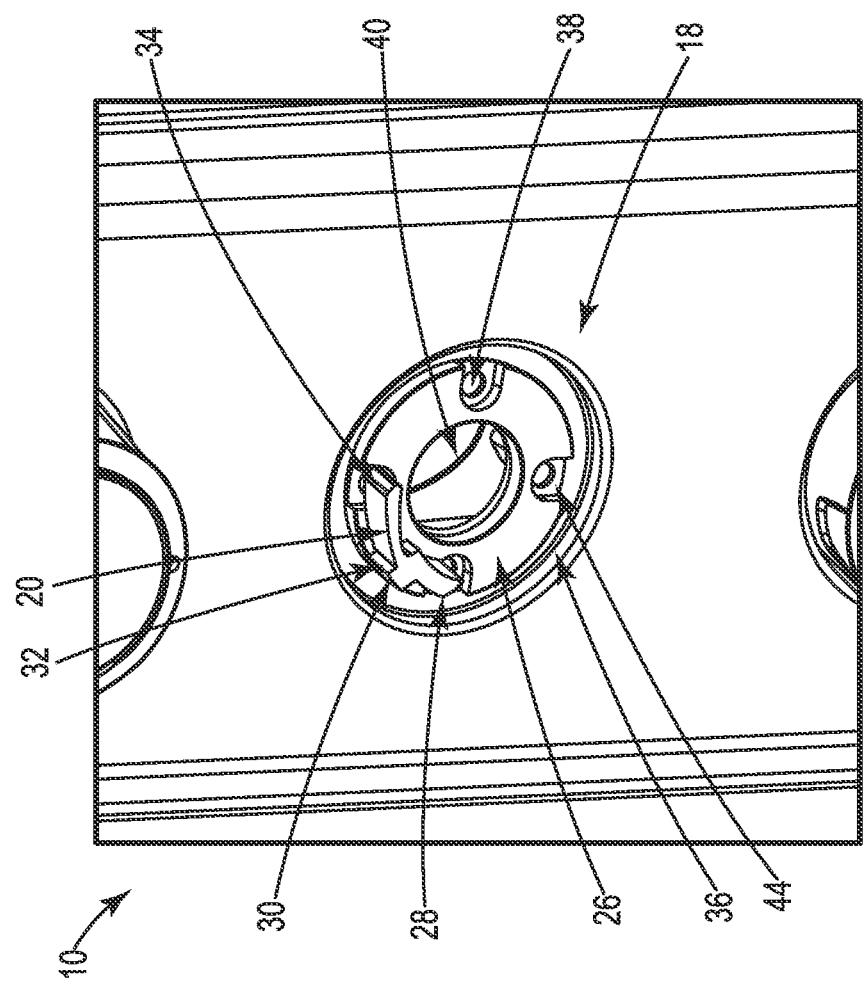
FIG. 6 is a perspective view of the control knob assembly of FIG. 3 with the control knob and control mechanism removed, according to various embodiments.

FIG. 6 illustrates an embodiment of the control knob assembly 10 similar to FIGS. 4 and 5, but with the control mechanism 62 including the rotatably-driven component 22 removed for clarity. When assembled with the knob 12, the rotatably-driven component 22 mechanically interfaces with the knob 12 for a rotation as induced by a user at the knob 12, or to be driven by a timer mechanism. Fasteners 24 are also removed as shown in FIG. 6 to show openings 38.

Still referring to FIG. 6, a recess 36 is shown in the housing 18. The recess 36 can advantageously allow for a flush mounting of the knob 12 when the control knob assembly 10 is complete. Furthermore, with fasteners 24 removed, fastener recesses 44 of the control mechanism interface portion 26 are also shown. Openings 38 can be configured such as with threads to receive fasteners 24 such as screws when the control knob assembly 10 is assembled.

The flexible detent 20 as shown can include various structural and/or operative sub-portions that attach to a ring-like base of the interface portion 26. Furthermore, various sub-portions of the flexible detent 20 are preferably configured to interface with the knob interface portion 50 of the knob 12 when the knob 12 is selectively rotated by a user, such as to select a heating setting of the oven. For example, the flexible detent 20 preferably includes (or is attached to) a structural reinforcement 28, a rotational stop 30 with a stop edge 32 (e.g., to operate as a hard stop). As shown, the flexible detent 20 includes an arm portion 42 and a contact ramp 34 having one or more curved or faceted portions, among other possible features and/or configurations in conformance with the present description and variations thereof. The contact ramp 34 and arm portion 42 of the flexible detent 20 can comprise an "operative" surface of the flexible detent, each alone or in combination. Although one flexible detent 20 (and associated tactile resistive rotational aspect and position) is shown, multiple flexible detents 20 could be incorporated into various embodiments, each with or without rotational stops 30 or stop edges 32. Each flexible detent can have an associated tactile resistive rotational aspect and position.

Figure 7:
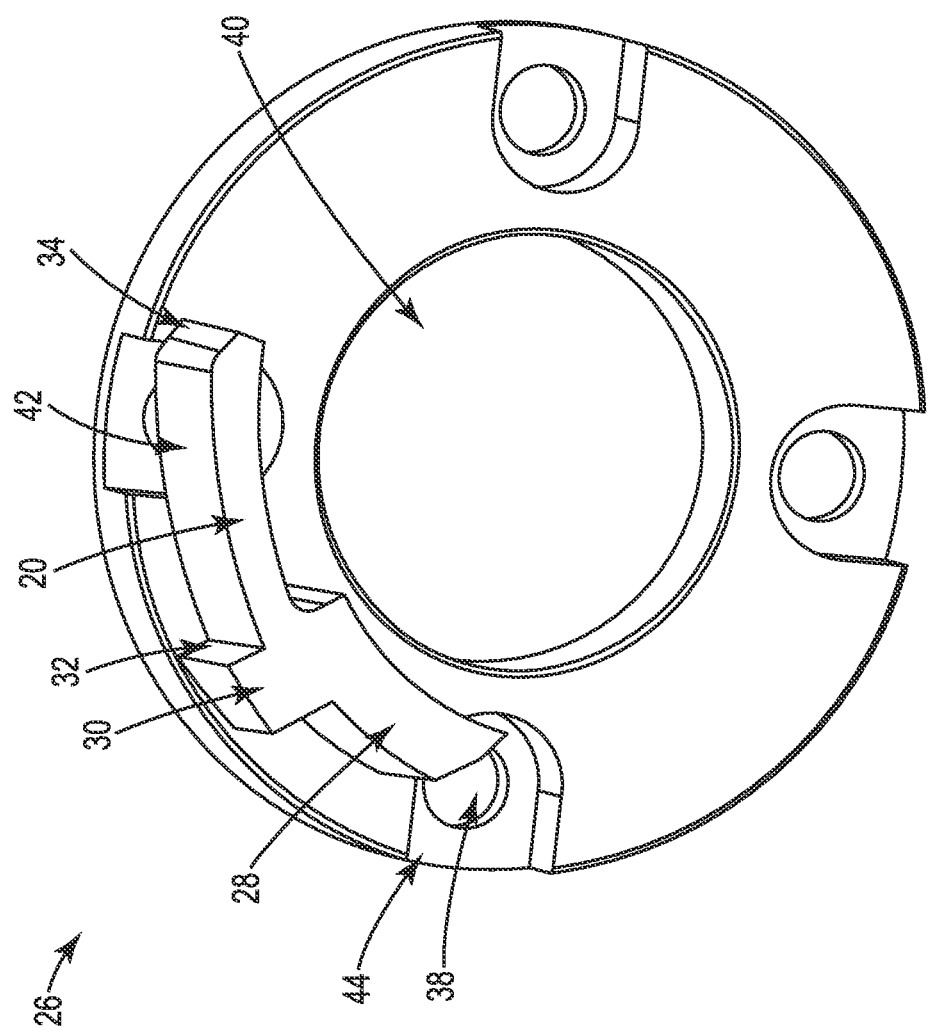
FIG. 7 is a perspective view of a control mechanism interface portion with a flexible detent, according to various embodiments.

Turning now to FIG. 7, the control mechanism interface portion 26 is shown in greater detail and as removed from the housing 18 of the oven. Also shown, control mechanism interface portion 26 comprises one or more rotationally-spaced recesses 44 corresponding to each opening 38. The recesses 44 can facilitate flush mounting of fasteners 24 when installed to permit rotation of the knob 12 without encumbrance by the fasteners 24, for example. Center opening 40 is also shown in greater detail, and can be generally round so as to allow the rotatably-driven component 22 to pass therethrough, and can include a smooth cylindrical or circular interior surface.

According to the embodiment shown in FIG. 7, the flexible detent 20 is also shown with a generally flat or curved arm portion 42 and multiple facets of contact ramp 34. The contact ramp 34 as shown preferably includes one or more faceted or rounded surfaces that are angled relative to the knob interface portion 50 during operation such that the knob interface portion 50, as moved rotationally in one direction, causes a flexing of the flexible detent 20 and resists further rotation of the knob 12 due to a force needed to flex arm 42, such as mechanical friction, between the flexible detent 20 and the knob interface portion 50. The contact ramp 34 as shown includes one relative maximum height or "peak," when resistance of the flexible detent 20 would be at a relative maximum, but other embodiments could include multiple peaks on the contact ramp 34 to impart various tactile feedback and/or resistance as the knob 12 is rotated by the user.

Figure 8:
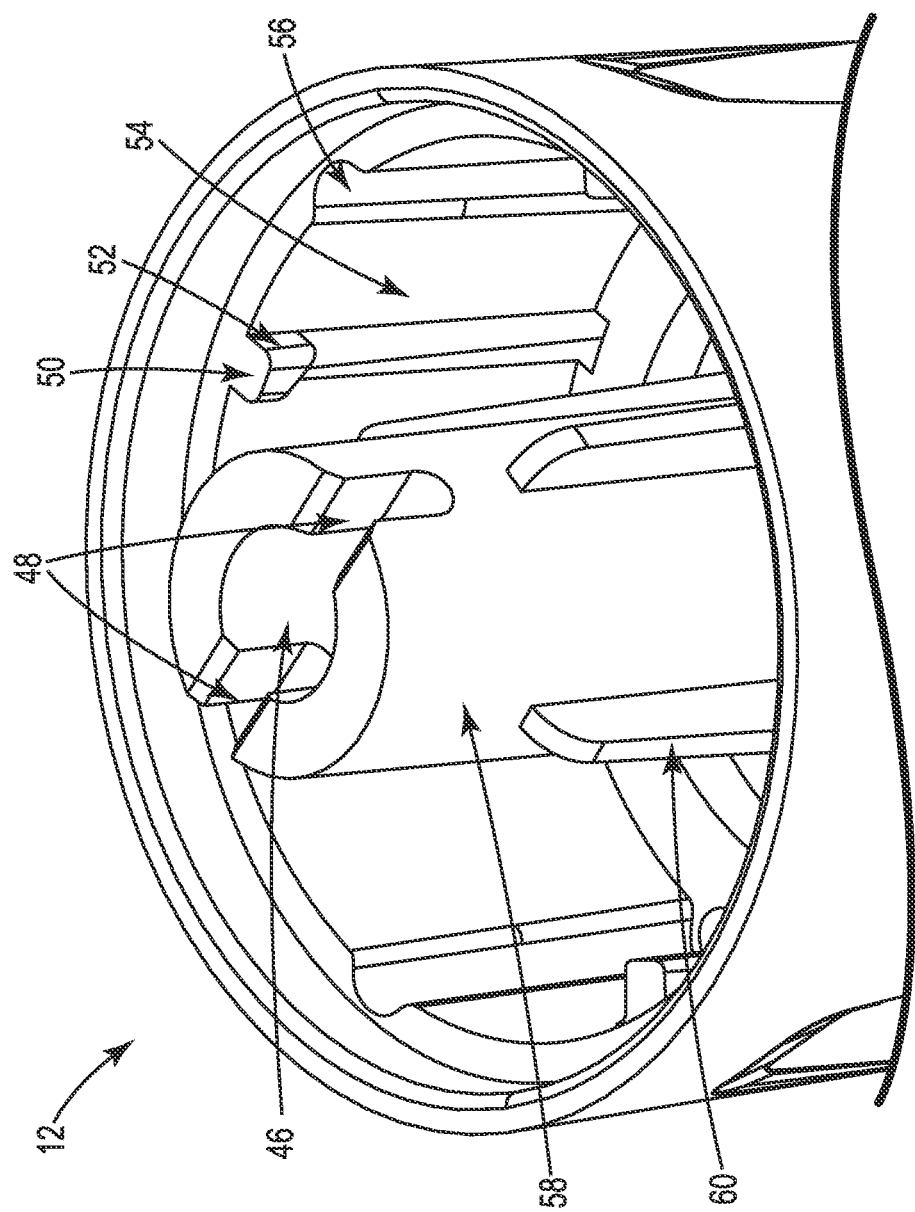
FIG. 8 is a perspective view of a control knob with a protrusion, according to various embodiments.

FIG. 8 shows an underside of the control knob 12 as would be viewed from below, or from a side of the knob 12 that would face the oven housing 18 when the oven is assembled. The knob 12 includes a center channel 46 and spline portion 48. The center channel 46 and the spline portion 48 of the knob 12 are preferably shaped and configured to rotatably drive and/or otherwise interface with the rotatably-driven component 22, such as during oven setting and/or cooking mode adjustment. The connection between the knob 12 and the rotatably-driven component 22 is configured to ensure the knob 12 and the rotatably-driven component 22 rotate together.

The knob 12 can be a push-on and removable type knob 12 that utilizes a friction and spline fit to hold securely to the rotatably-driven component 22. As shown, the knob 12 can have a generally open interior 54 into which a knob shaft 58 protrudes. The knob shaft can include one or more structural ribs 60 to strengthen and reinforce the knob shaft 58, including strengthening the knob 12, such that a torque on the knob 12 maintains structural integrity after repeated use. In one example (not shown), the knob 12 utilizes a push-on D-shaped spline interface with the rotatably-driven component 22.

Also as shown the knob interface portion 50 of the knob 12 interior can preferably include one or more angled or curved operative surfaces 52. The knob interface portion 50 can be a protrusion in various embodiments. The operative surfaces 52 can be angled to a direction of rotation and can interface with the flexible detent 20, including the contact ramp 34 and/or arm portion 42 of the flexible detent 20. The shape, size, structure, and configuration of the operative surfaces 52 of the knob interface portion 50 can be selected and defined also in conjunction with the flexible detent 20 in order to achieve desired knob 12 adjustment characteristics, including a predetermined desired torque threshold required to cause the knob 12 to pass from the off position (e.g., a first position) to the always-on position (e.g., a second position). Also shown best with reference to FIG. 8, the interior of the knob 12 can have one or more concave channels 56.

Figure 10:
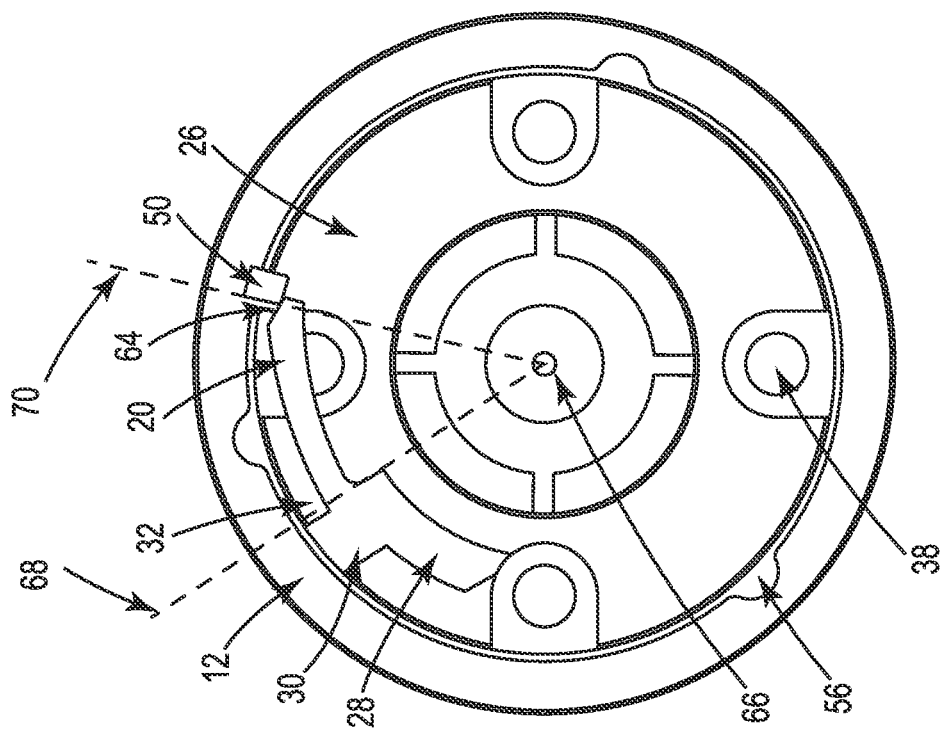
FIG. 10 is a front view of the control mechanism interface portion of FIG. 7 and the control knob of FIG. 8 in an off position, according to various embodiments.

FIGS. 9-13 show various front views of the control mechanism interface portion 26 and the control knob 12 in various cooking mode positions, according to various embodiments. A shown, a first rotation axis 66 is shown at a common axis of the control mechanism interface portion 26 and the control knob 12. Also shown are two example positions of the knob interface portion 50 of the knob 12 relative to the control mechanism interface portion 26. As shown, the always-on position 68 (e.g., always-on position 14 of FIG. 3) corresponds to the knob interface portion 50 reaching the stop edge 32 of the flexible detent 20, and the off position 70 (e.g., off position 16 of FIG. 3) corresponds to the knob interface making initial friction and torque-resistive contact 64 as shown in FIG. 10. The torque-resistive contact 64 between the off position 70 and the always-on position 68 can include initial torque resistance, and can require sustained torque in order for the knob 12 to flex the arm 42 of the flexible detent 20 and to pass the contact 64 and achieve always-on position 68. Preferably, at least one of the flexible detent 20 and the protrusion 50 are arranged to interact so that the protrusion 50 abuts the flexible detent 20 at the off position 70 and causes the flexible detent 20 to flex in order to move the control knob 12 to the always-on cooking mode (or any other second cooking mode). In some embodiments, the flexible detent 20 flexes in a radial direction as the knob interface portion 50 (including the protrusion) and the flexible detent 20 move rotationally relative to each other.

In the example shown, a predetermined torque threshold can be defined in the CCW direction at which the contact 64 permits a rotation of the knob 12 to the always-on position 70. Below the torque threshold, a user may receive tactile feedback indicative that a user is rotating the knob 12 beyond the off position. 68. As shown in FIG. 3, various rotational arcs (e.g., F1, F2, F3, etc.) of the knob 12 are contemplated as oven heating adjustments that are made by the user and/or a timing device.

Figure 9:
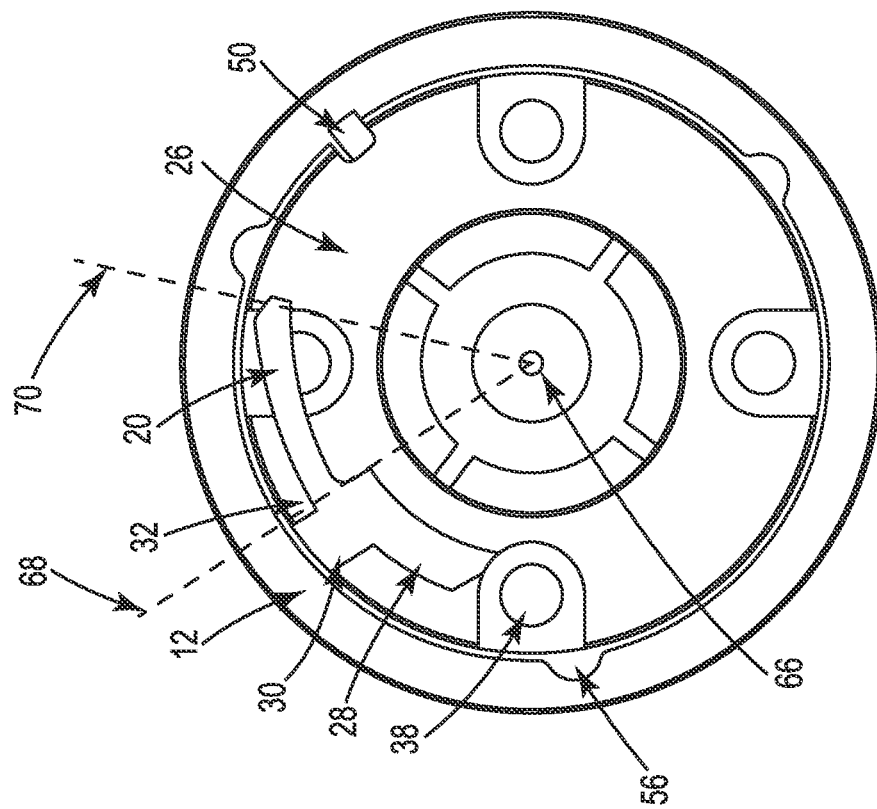
FIG. 9 is a front view of the control mechanism interface portion of FIG. 7 and the control knob of FIG. 8 in a first cooking mode position, according to various embodiments.

FIG. 9 shows an example of a first, timed cooking mode of the oven. When the knob 12 is rotated in one rotational direction such that the knob interface portion 50 rotates beyond the position 70, the oven can be in an on, but timed mode. Without passing CCW of the off position 70, the user rotating the knob in a second, reverse rotational direction may experience only minimal tactile rotational resistance as the amount of time for cooking is selected using the knob 12. The amount of time that oven remains on can be related to how far the user rotates the knob 12 beyond the position 70. If the user allows the oven to operate normally when in the timed cooking mode, the oven will turn off and the knob interface portion 50 and the knob 12 itself will return to the off position 70 after the time has passed. If the user wants to stop the heating prior to expiration of the set time, the user will feel the off position as the knob interface portion 50 abuts the flexible detent 20.

FIG. 10 shows the knob 12 in an off position 70 of the oven. As shown the knob interface portion 50 of the knob 12 achieves the off position 70 when contact is made between the knob interface portion 50 and the flexible detent 20. The arrangement shown in FIG. 10 can correspond to an oven that is currently off, including after a timed period has passed, e.g., after a setting as shown in FIG. 9. Rotation in one rotational direction requires less torque or force, i.e., to arrive at a first, timed cooking mode position than in the reverse rotational direction (i.e., to a second cooking mode position).

Figure 11:
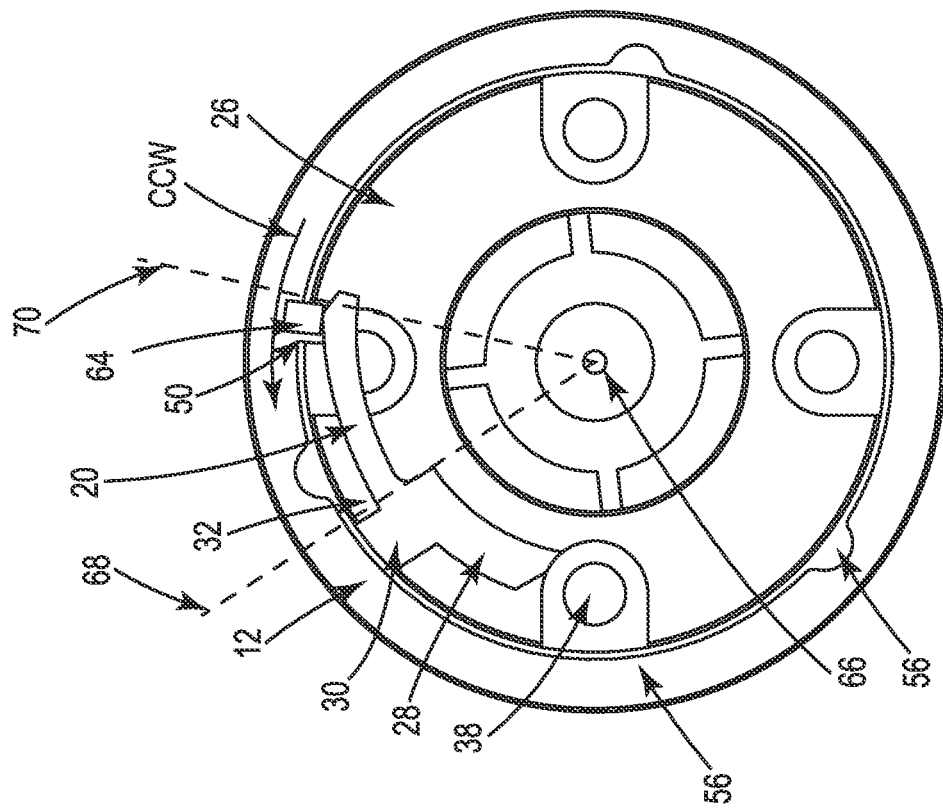
FIG. 11 is a front view of the control mechanism interface portion of FIG. 7 and the control knob of FIG. 8 as the protrusion initially overcomes a rotational resistance of the flexible detent, according to various embodiments.

FIG. 11 shows an example knob 12 position, such as where the knob interface portion 50 overcomes an initial rotational resistance of the flexible detent 20 in the CCW direction, according to various embodiments. As shown, the tactile feedback control of the knob 12 in FIG. 11 is an example of an oven equipped with unintentional oven 200 heating avoidance and/or protection when a user does not desire the oven 200 to be heated. Therefore, as the knob 12 is rotated CCW to off position 70, an "over-rotation" of the knob 12 to an always-on position 68 may be resisted via tactile feedback and/or resistance. However, a user may determine that the always-on position 68 is desirable. A user can then rotate the knob 12 with a greater amount of force in the CCW direction such that a predetermined torque threshold at contact 64 is met or exceeded, whereby the knob 12 and knob interface portion 50 pass the arm portion 42 of the flexible detent 20 (see FIG. 12), and reach the stop edge 32 upon arriving at the always-on position indicated at 68 (see FIG. 13). The always-on position 68 can correspond to a second cooking mode, and a timed position as shown in FIG. 9 can correspond to another, separate cooking mode, such as a first cooking mode as used herein. As shown, the positions always-on position 68 and the off position 70 are rotationally spaced.

Figure 12:
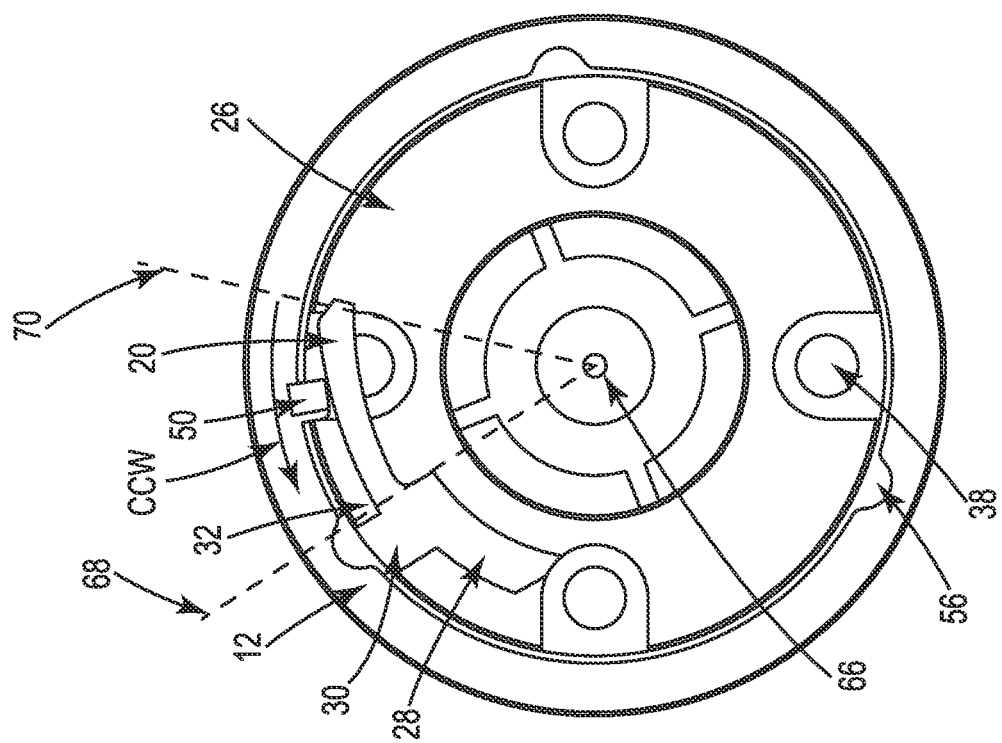
FIG. 12 is a front view of the control mechanism interface portion of FIG. 7 and the control knob of FIG. 8 as the protrusion passes the flexible detent, according to various embodiments.

Although CCW knob 12 rotation is shown with reference to FIGS. 11 and 12, various corresponding or other CW rotational movements are also contemplated. For example, when rotating the knob 12 from the always-on position 68 to the off position 70, a rotational torque at the knob 12 may be less in the CW direction than would be required in the corresponding CCW due to the angles and interactions of the various portions (e.g., 42, 34 of the flexible detent 20 and/or 52 of the knob interface portion 50). In this way, the user may feel a tactile feedback to reach the off position 70 when returning from the always-on position 68, but it may require less force for the user to turn the oven to the off position 70 than to the always-on position 68. Furthermore, the user may feel a tactile feedback if an attempt is made to rotate knob 12 beyond the stop edge 32 at the always-on position 68 as shown in FIG. 13. See also various torque data shown in FIGS. 14-16, below.

FIG. 14 shows testing data 400 for a knob resistance torque of a always-on function when turning a prior art heating appliance on or off.

FIG. 14. illustrates a baseline torque value (in inch-ounces) as measured in testing that is required to turn a knob from an off position to an always-on position with current prior art mechanical timer toaster ovens that include no additional resistive components, such as a flexible detent (e.g., flexible detent 20 as described above). Therefore the testing data 400 demonstrates the torque resistance provided by a timer mechanism, e.g., as operated through the rotatably-driven component 22. Data 400 also shows there is little difference between the torque required to turn an example oven from a timed setting to the off position (e.g., from a 30-minute timed setting to the off position) and from the off position to the always-on position. Therefore, FIG. 14 can illustrate a baseline torque threshold to which data 500 of FIG. 15 can be compared for reference.

FIG. 15 shows testing data 500 for a knob resistance torque of a always-on function when turning a heating appliance on or off, according to various embodiments.

Data 500 of FIG. 15 illustrates a measured torque as a knob (e.g., knob 12) turning from the off position (e.g., off position 70) to the always-on position (e.g., the always-on position 68). The data 500 shows that approximately two times the torque is required for a user to turn the knob 12 from the off position 70 to the always-on position 68. Thus, the data 500 illustrates that a flexible aspect, such as the flexible detent 20, can provide tactile feedback control as described herein. As shown, according to various embodiments, there is not an increased torque to turn the knob 12 from the always-on position 68 to the off position 70. Thus, the user can preferably return the appliance, such as oven 200, to the off position 70 without significant additional torque.

FIG. 16 shows testing data 600 for knob resistance torque of a timer function when turning the heating appliance on or off, according to various embodiments.

Data 600 shows an example baseline torque data for turning an appliance knob from an off position (e.g., off position 70) to a timed parameter setting within in the range of time parameters settings. Data 600 demonstrates the usual torque the user exerts to rotate the knob for setting cooking times, e.g., 60-minutes.

FIGS. 17-30 illustrate a second embodiment of a control knob assembly 74 for use with a heating appliance (e.g., ovens 100, 200), according to various embodiments. The control knob assembly 74 as shown comprises a control knob 76 that interacts with a control mechanism interface portion 78, similarly as does the knob 12 and control mechanism interface portion 26 of the above described embodiment. Likewise, a shaft 84 as an output from the knob 76 can drive various components, such as the control mechanism 62 described above. The control knob assembly 74 provides a tactile control feedback aspect like the above control knob assembly 10. However, instead of having one of the directly interacting components, such as the flexible detent 20, providing the flexing necessary to allow further turning after experiencing an increase torque, this embodiment provides an indirect flex component. Also like the above embodiment of control knob 10, the knob 76 includes a protrusion 80 extending from the knob 76 to engage with an element of the control mechanism interface portion 78, in this case comprising a similar ramp-shaped protrusion 82 as the ramp-shaped protrusion 80. As above, the engagement element or protrusion 82 is fixed with the control mechanism interface portion 78 to an oven housing also as above. The protrusions 80 and 82 abut one another in a rotary direction of the knob 76, which point of contact is preferably at the off position, as discussed above. These protrusions 80, 82 would prevent further knob turning without an ability to allow a small amount of axial and/or radial movement of the protrusions 80, 82 relative to one another. A preferred manner of allowing some movement subject to the application of a desired increased torque threshold as is described below. Such interaction provides a tactile feedback to a user during heating appliance operation and control.

According to the second embodiment, a rotational force therefore can be applied in a rotary direction to the knob 76 to achieve a desired cooking mode, such as an always-on cooking mode. The rotary movement of the knob 76 into the desired cooking mode via the rotational force can be resisted by one or more components, and the rotary movement can be facilitated using the indirect flex component and both a flexing in an axial direction in addition to a cam action as the knob 76 is rotated.

Figure 17:
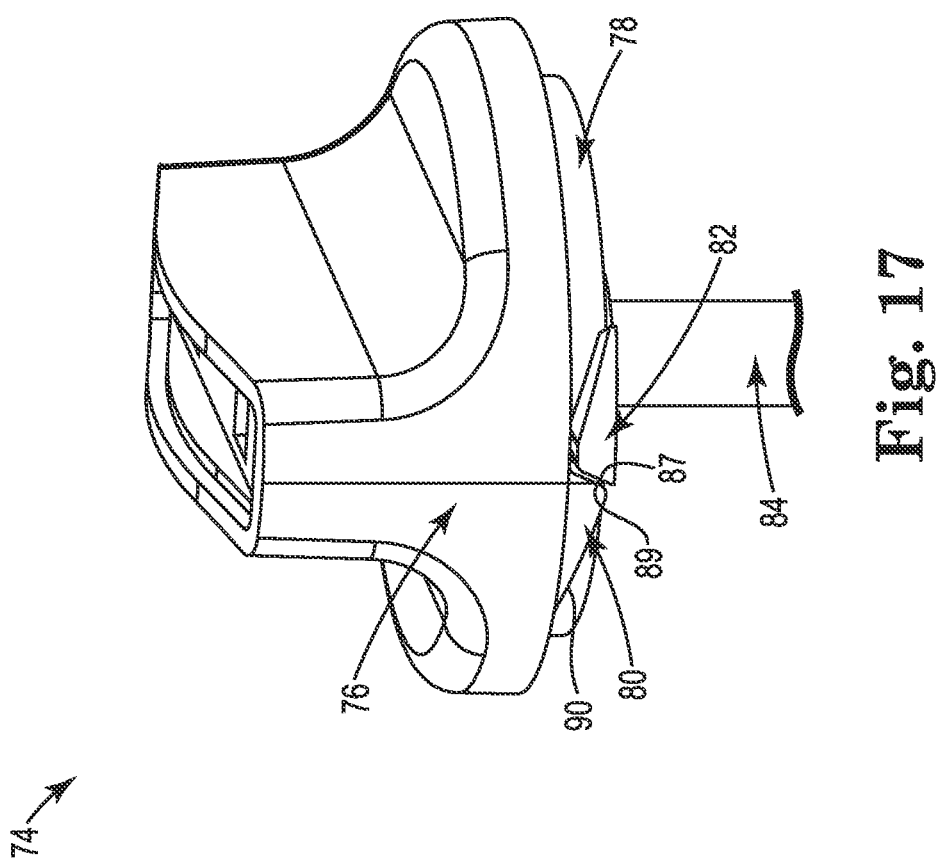
FIG. 17 is a perspective view of a second embodiment of a control knob assembly for use with a heating appliance, according to various embodiments.
Figure 19:
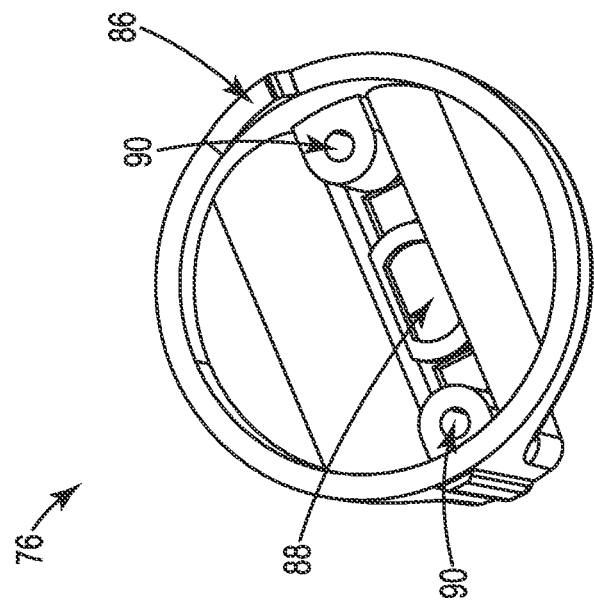
FIG. 19 is another perspective view of a knob of the control knob assembly of FIG. 17, according to various embodiments.
Figure 18:
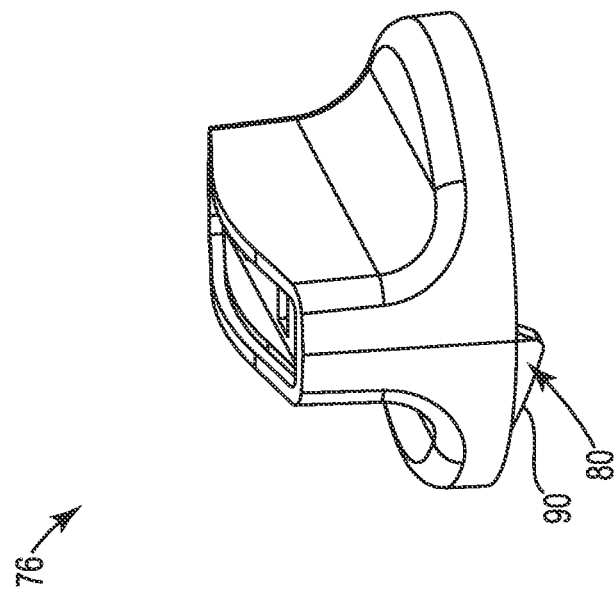
FIG. 18 is a perspective view of a knob of the control knob assembly of FIG. 17, according to various embodiments.

As shown with reference to FIGS. 17-19, the control knob assembly 74 comprises the control knob 76 with the ramped protrusion feature 80. The control knob assembly 74 comprises the control mechanism interface portion 78 with the ramped protrusion feature 82 configured to slidably interface with the protrusion feature 80 during operation of the knob assembly 74.

With reference to FIG. 19, the knob 76 comprises an elongated (e.g., corresponding to center channel 46 and/or spline portion 48 of FIG. 8) shaft interface feature 88, which provides for rotational connection of the knob 76 with the shaft 84, but that includes an amount of "play" in the connection of the knob 76 to the shaft 84 allowing for a small amount of sliding movement of the knob 76 to the shaft in the radial direction. Also shown are a pair of holes 90 that can be used for attachment of an indirect flex component as described below. The shaft 84 can be operatively connected to a rotatably-driven component 22, as described above.

Figure 20:
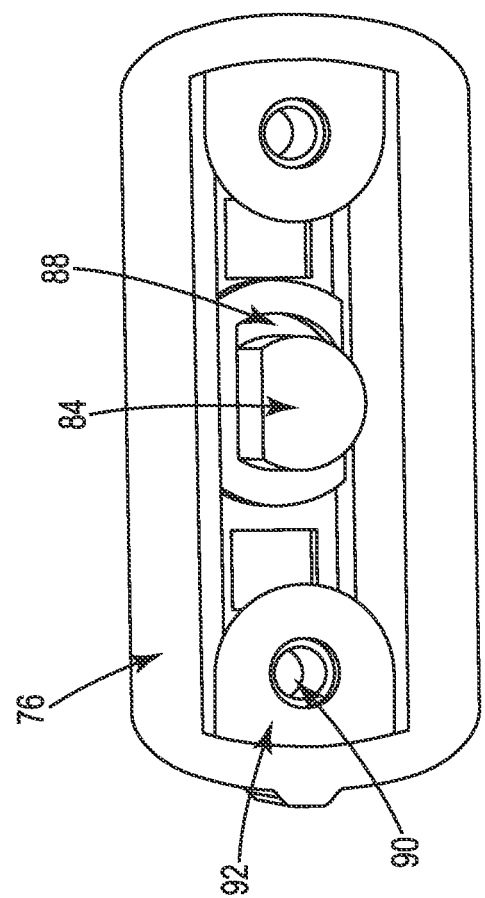
FIG. 20 is a perspective view of selected components of the control knob assembly of FIG. 17.

FIG. 20 is a perspective view of selected components of the control knob assembly 74. In particular, with reference to FIG. 20, the shaft interface feature 88 comprises a "D" shaped recess with a perimeter having a flat portion and a rounded portion to pivotally connect the shaft 84 having a similar shape. Other shapes and configurations of the shaft interface feature 88 and/or the shaft 84, itself, are also contemplated.

Figure 26:
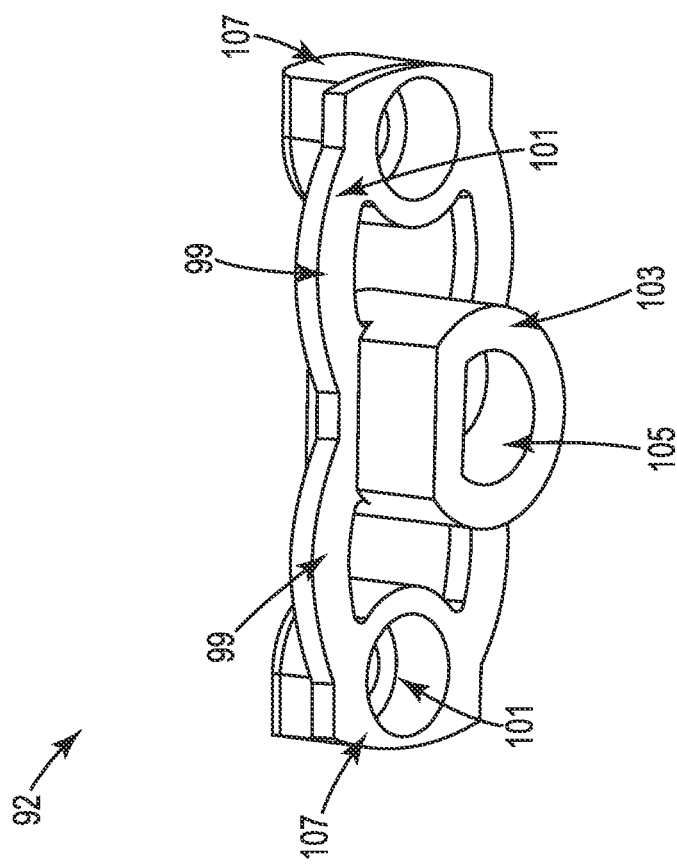
FIG. 26 is another perspective view of the flexible adapter component of the control knob assembly of FIG. 17, according to various embodiments.
Figure 25:
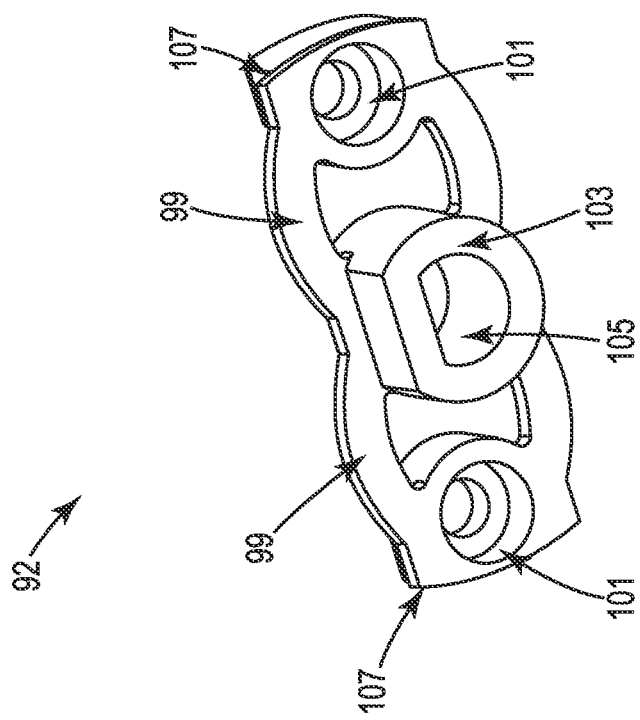
FIG. 25 is a perspective view of a flexible adapter component of the control knob assembly of FIG. 17, according to various embodiments.

In FIGS. 25 and 26, an indirect flex component 92 is illustrated. The flex component 92 preferably comprises a center shaft interface portion 103 with a shaft interface opening 105 that is preferably shaped to securely attach the flexible component 92 to the shaft 84 without substantial play. The attachment of the shaft 84 to the flexible component 92 is preferably a friction-fit attachment. As shown, the flexible component 92 also has two wing portions 107, each with a fastener attachment opening 101 (corresponding to apertures 90 of the knob 76) and a pair of flexible arms 99 for each wing portion 107. The wing portions 107 can each be securely attached to the corresponding aperture 90 of the knob 76 as shown in FIG. 20 (without the arms 99). The flexible arms 99 allow the flex component 92 to flex, stretch, compress, bend, or the like. As shown, two flexible arms 99 are shown per wing portion 107, although one, two, three, or more flexible arms 99 can be utilized according to various embodiments. The flex of the flex component 92 along with the play at the connection of the shaft 84 with the knob 76 allows a desired amount of axial and radial movement of the knob 76 to allow the protrusions 80, 82 to pass one another with the application of a threshold torque as described in greater detail below.

Figure 21:
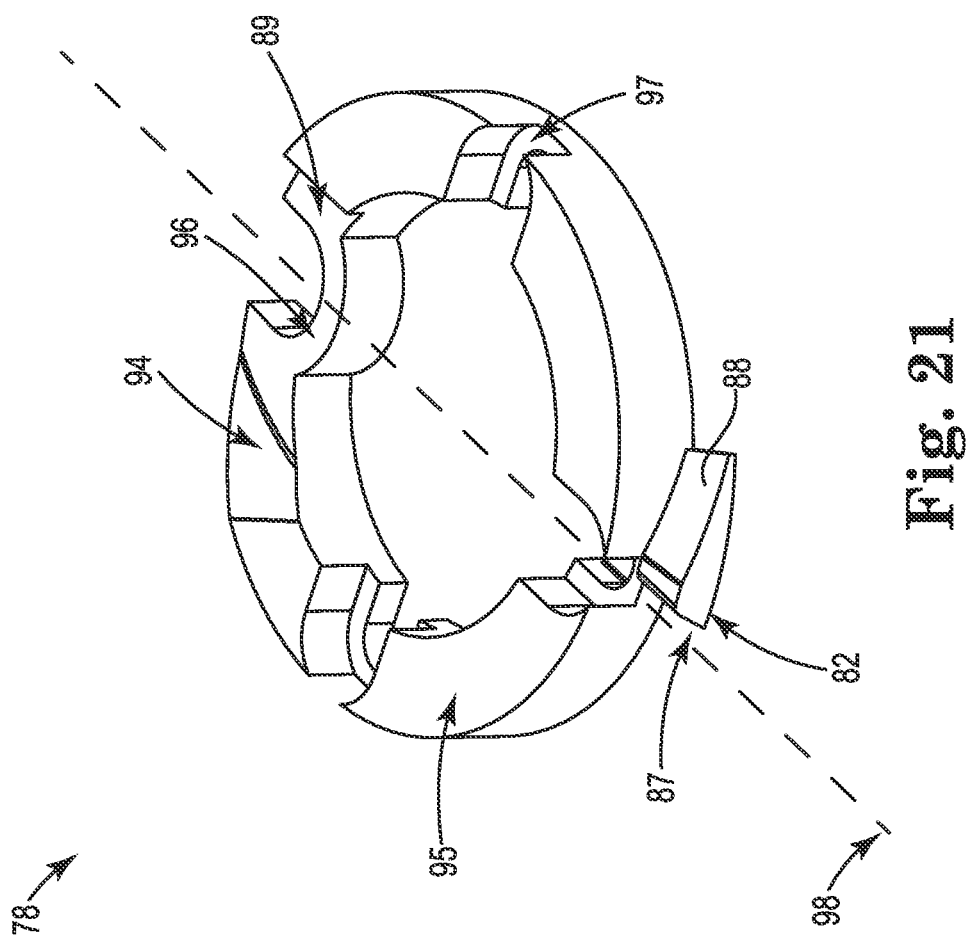
FIG. 21 is a perspective view of a control mechanism interface portion of the control knob assembly of FIG. 17, according to various embodiments.
Figure 24:
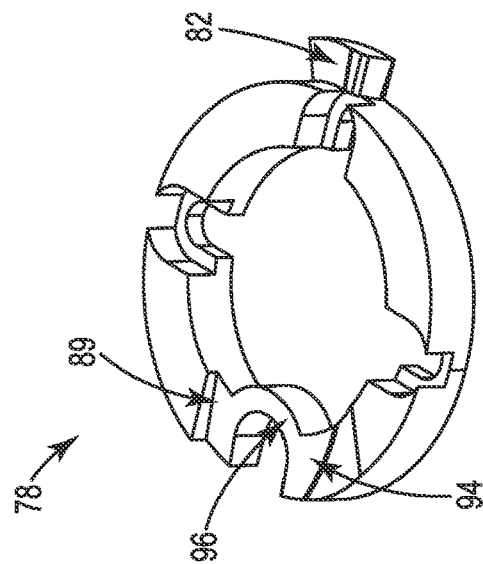
FIG. 24 is even yet another perspective view of the control mechanism interface portion of the control knob assembly of FIG. 17, according to various embodiments.

The control mechanism interface portion 78 of the second embodiment is shown in greater detail with reference to FIGS. 21-24. With reference in particular to FIG. 21, the control mechanism interface portion 78 is preferably a single-piece, with a flat upper rim 95 portion to be positioned below the knob 76 when assembled together. Also, the control mechanism interface portion 78 includes a rim ramp portion 94 as a part of the perimeter along with the upper rim 95 portion leading to an edge 89. A recessed fastener receiving feature 97, and a flush fastener receiving feature 96 are also provided along the perimeter of the control mechanism interface portion 78. The protrusion 82 extends outward from the perimeter of the control mechanism interface portion 78 and is preferably positioned relative to the rim ramp portion to allow tilting of the knob 76 as the protrusion 80 of the control knob 76 contacts the protrusion 82 of the control mechanism interface portion 78.

As shown, a diametric line 98 bisects the control mechanism interface portion 78. According to the illustrative line 98, a predominantly axial portion 87 of the detent 82 is radially positioned adjacent to the line 98. A gradual sloped portion 88 extends from the portion 87 along the perimeter of the control mechanism interface portion 78 away from the line 98. FIG. 17 shows the predominantly axial portion 87 of the protrusion 82 in engagement with a predominantly axial portion 89 of the protrusion 80 of the knob 76. This interaction creates the desired threshold torque. As the knob 76 is turned further, the portions 87 and 89 cause the knob 76 to move by cam action axially as permitted by the flex component 92 and to tilt as permitted by the radial play built into the knob/shaft connection. Then the gradual sloped portion 88 and a similar gradual sloped portion 90 of the protrusion 80 interact to reduce the axial offset and then define a second mode position, such as an always on cooking position, as described above.

Figure 23:
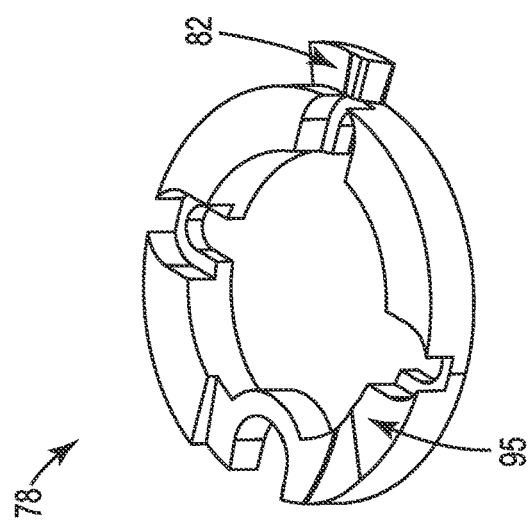
FIG. 23 is yet another perspective view of the control mechanism interface portion of the control knob assembly of FIG. 17, according to various embodiments.
Figure 22:
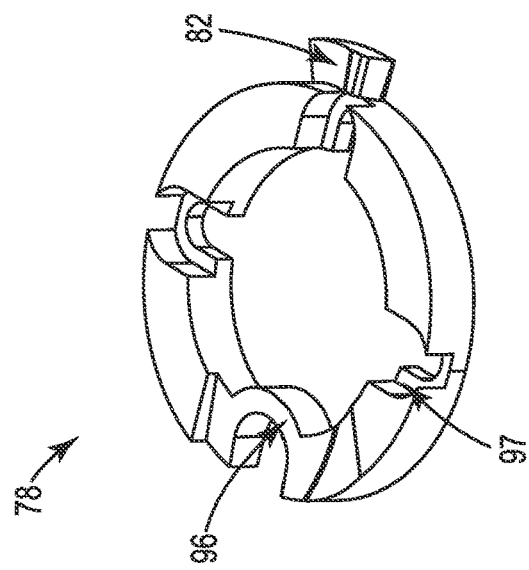
FIG. 22 is another perspective view of the control mechanism interface portion of the control knob assembly of FIG. 17, according to various embodiments.

FIG. 23 shows the flat upper rim 95 portion that keeps the knob 76 from tilting over the majority of its rotary positions. The sloped rim ramp portion 94 accommodates tilting of the knob 76 when the cam shaped protrusions 80, 82 interact during rotational movement toward the second mode position.

Figure 28:
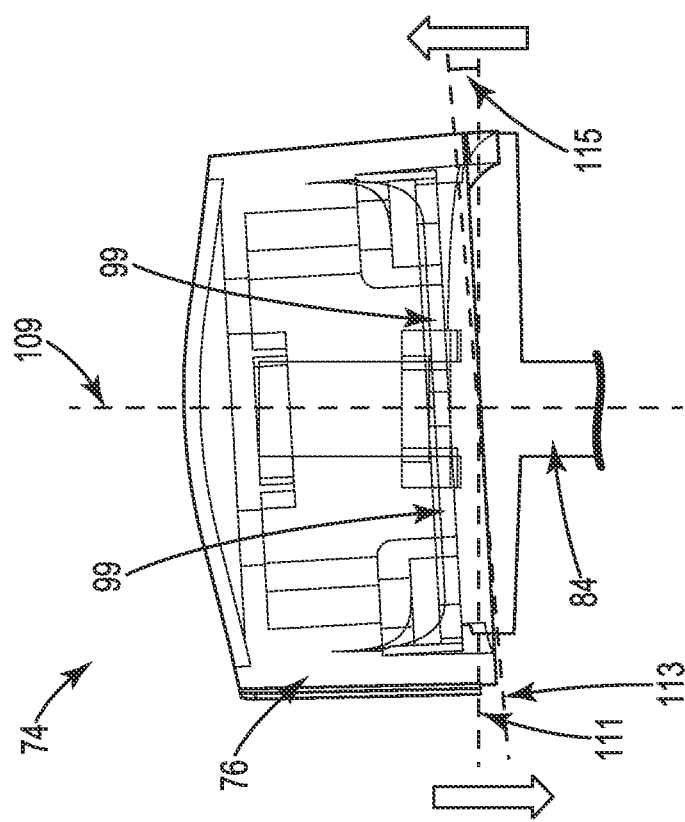
FIG. 28 is a profile view of the control knob assembly of FIG. 17 with the knob and flexible adapter in a pivoted position, according to various embodiments.
Figure 27:
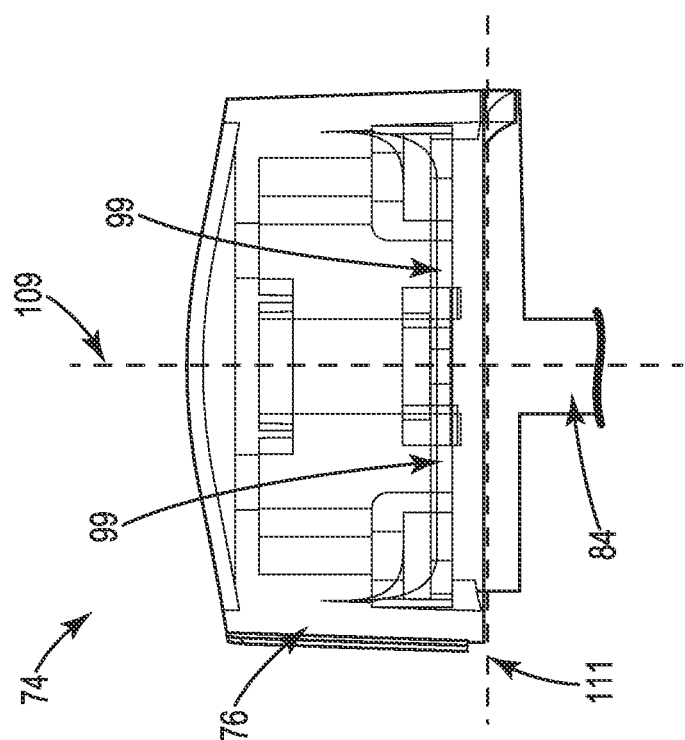
FIG. 27 is a profile view of the control knob assembly of FIG. 17 with a knob and flexible adapter in a resting position, according to various embodiments.

Turning now to FIGS. 27 and 28, operation of the control knob assembly 74 is shown from a profile view according to various stages of operation by a user. FIG. 27 is a profile view of the control knob assembly 74 with a knob 76 and flex component 92 in a resting, un-flexed position, and FIG. 28 is a profile view of the control knob assembly 74 with the knob 76 and flex component 92 in a tilted, flexed position, according to various embodiments. As shown, an axis 109 corresponds to a fixed angle of the shaft 84, which can be axial (e.g., vertical as shown), or perpendicular to axial (e.g., horizontal as shown) in embodiments where the control knob assembly 74 is operatively mounted to a heating appliance, such as oven 200. In the resting position shown with reference to FIG. 27, the knob 76 is orthogonally positioned according to horizontal perpendicular axis 111. The flexible arms 99 of the flexible adapter 92 are also unstressed and in the rest position, as shown in FIG. 27.

With reference now to FIG. 28, the control knob assembly 74 is shown where the knob 76 is tilted as features 80 and 82 pass each other when the user turns the knob 76 with tactile feedback, where a portion of the knob 76 positioned proximate the feature 80 and 82 is caused to rock or pivot in order to allow the features to pass. For example, an example heating appliance can achieve an always-on setting or cooking mode when the features 80 and 82 pass each other during rotation and pivoting of the knob 76. The user would detect a movement of the knob 76 via tactile feedback as the features 80 and 82 pass each other after a torque and/or pivot angle 115 is formed where a knob axis 113 pivots relative to the horizontal axis 111, as shown. Following the pivot of the angle 115, the knob 76 can then return to the position as shown in FIG. 27. When the user decides to change the heating appliance from the always-on cooking mode to an off or timed setting, the features 80 and 82 can pass each other where the cam surfaces make such a rotation have a relatively lower rotational torque requirement such that a user can easily return the appliance to other cooking modes other than the always-on cooking mode. Other embodiments and torque threshold and detent variations are also contemplated.

FIGS. 29 and 30 show the flex component 92 in resting, un-flexed (FIG. 29) and tilted, flexed (FIG. 30) states, which generally correspond to the knob 76 as it is pivoted as shown with reference to FIGS. 27, and 28, respectively. The flex component 92 as shown in FIG. 29 generally corresponds to the unstressed, un-flexed, or resting state as shown in FIGS. 25 and 26, above, and shows the flex component 92 in the resting position. As shown with reference to FIG. 30, opposite wings 107 move in opposite shearing directions during pivoting of the knob 76, as shown by the arrows A and B. Relatively high stress occurs at the flexible arms 99 during tilting, as shown by a the shaded zones (e.g., with shading as shown when stressed vs. unshaded when at rest). The various parts and components of the flex component 92 can be composed of any plastic, elastomeric, rubber-like, or any other suitable material that preferably permits repeated pivoting movements while still allowing the flexible adapter 92 to return to its original shape when in the resting position.

FIGS. 31-40 illustrate a third embodiment of a control knob assembly 150 for use with a heating appliance (e.g., ovens 100, 200), according to various embodiments. According to the third embodiment, an indirect flexible component, most similar to the second embodiment described above, attaches to a knob 154 and a shaft (for driving various rotational components and/or control module, as described elsewhere herein). However, in this embodiment, additional user manipulation is required to both apply a torque to rotate the knob 154 to a second cooking position on the other side of an off position, along with an axial shifting of the knob 154. As in both previous embodiments, a flexible component is incorporated within the design to permit the user manipulation.

Figure 31:
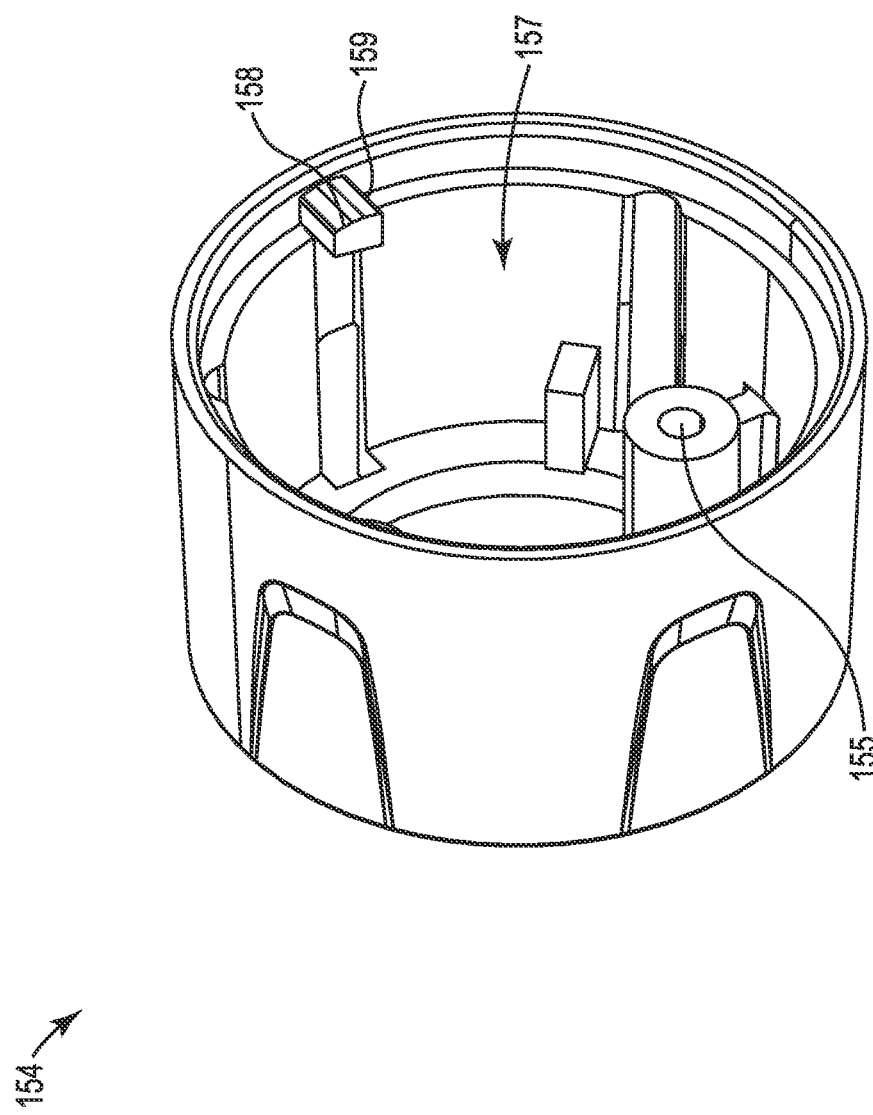
FIG. 31 is a perspective view of a knob of a third embodiment of the control knob assembly, according to various embodiments.

With reference to FIG. 31, the knob 154 is preferably formed as a single unit and comprises a protrusion 158 protruding radially (into an interior 157, as shown) and at least one mounting hole 155. The protrusion 158 provides a knob stop surface 159 extending in an axial direction. The knob 154 interacts with a control mechanism interface portion 152 (FIG. 32), similarly as does the knob 74 and control mechanism interface portion 78 of the above described second embodiment of FIGS. 17-29. The knob 154 provides a feature that rotatably drives various oven components (e.g., corresponding to center channel 46 and/or spline portion 48 of FIG. 8) and/or other rotatably-driven components and/or control mechanism as described herein. The knob 154 is operatively connected to the control shaft (e.g., shaft 84 in FIG. 17) in a manner for rotational movement and as described in detail below.

Figure 33:
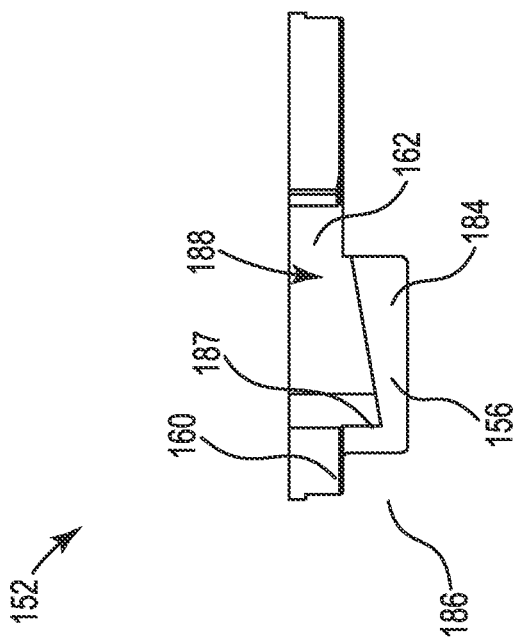
FIG. 33 is a side view of the control mechanism interface portion of FIG. 32, according to various embodiments.
Figure 32:
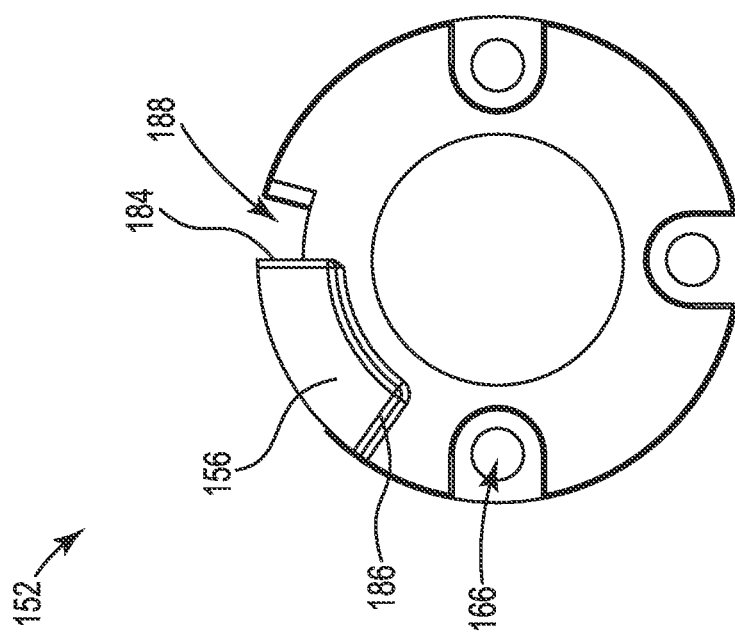
FIG. 32 is a perspective view of a control mechanism interface portion for use with the knob of FIG. 31, according to various embodiments.

With reference to FIGS. 32 and 33, and as in the embodiments discussed above, an engagement element or protrusion 156 is fixed with the control mechanism interface portion 152 to the oven housing. The control mechanism interface portion 152 preferably comprises one or more holes 166 for mounting to the housing. The control mechanism interface portion 152 protrusion 156 preferably includes a ramped face 187 that slopes from an engagement surface 184 to a stop surface 160 located proximate a second face 186 of the protrusion 156. When the control mechanism interface portion 152 is assembled with knob 154, the knob 154 will gradually axially shift generally back to a resting axial position as axial protrusions pass each other during and after knob 154 actuation. The protrusion 156 can optionally have a level face or any other suitable shape that allows the knob protrusion 158 to contact the engagement surface 184, be moved axially, and slide across a surface of the protrusion 156 during tactile interaction by the user.

The control mechanism interface portion 152 is preferably a single-piece mounted to the oven housing. A recessed fastener receiving feature such as one or more holes 178 are also provided along a perimeter of the control mechanism interface portion 152 for mounting. The openings 178 that can be configured such as with threads to receive fasteners (e.g., fasteners 24) such as screws when the control knob assembly 150 is assembled. The protrusion 156 extends axially from a portion of the control mechanism interface portion 152 that abuts the oven housing when assembled, and is preferably positioned relative to a gap 188 in the perimeter of the control mechanism interface portion 152 that preferably provides for (e.g., axial) movement of the protrusion 158 to move relative to the control mechanism interface portion 152 and protrusion 156 during tactile operation of the knob 154. The protrusion 158 of the knob 154 abuts the engagement surface 184 when in the off position, and abuts the stop surface 160 when in the always-on position. The knob 154 can be attached to an indirect flexible component such that the two rotate together during operation, as described.

Figure 34:
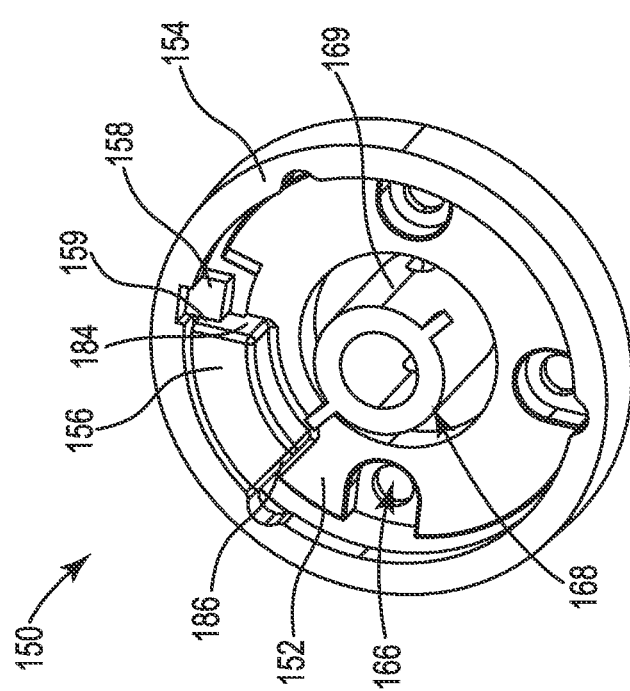
FIG. 34 is a partial cross-sectional perspective view of selected components of a control knob assembly of the third embodiment, according to various embodiments.

FIG. 34 is a partial cross-sectional view of the knob 154 and control mechanism interface portion 152 of the control knob assembly 150, in which the knob 154 is partially hidden to show the predominantly axial portion of the engagement surface 184 of the protrusion 156 in engagement with a predominantly axial knob stop surface 159 of the protrusion 158 of the knob 154. This axial face to axial face interaction (or any other interference interface) creates desired tactile hard stop feature where the stop surface 159 of the knob 154 abuts the engagement surface of the protrusion 156, causing the knob 154 to not be rotatable beyond the off position without a relative axial movement between the protrusions 156, 158. As shown best in FIG. 33, a ramped face 187 of the protrusion 156 facilitates movement of the knob 154 protrusion smoothly as the always-on position is approached and reached. In various alternative embodiments, two protrusions 156 and/or two protrusions 158, with corresponding operative surfaces, can be included in the control knob assembly 150, and can be spaced at for example, 180-degree offsets.

The engagement surface 184 and the stop surface 159 of the control knob assembly 150 therefore create a "hard stop" tactile feature at the off position such that a tactile control of a knob 154 of the control knob assembly 150 is not primarily based not on a primarily rotational torque threshold of two cam surfaces (as in the above described embodiments), but rather on an axial sliding movement or actuation of the knob 154 in order to release two abutting predominantly axial (e.g., 184 and 159) faces, then allowing for a rotation of the knob 154 between the off position and the always-on position and mode. A flexible adapter 168 described further below is an example of the above indirect flexible component.

Figure 36:
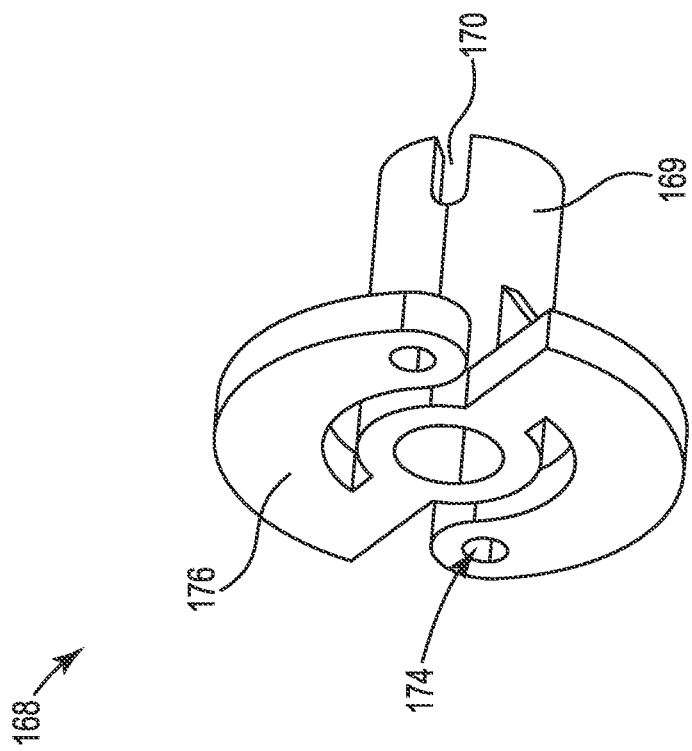
FIG. 36 is a rear perspective of the flexible adapter of FIG. 35, according to various embodiments.
Figure 35:
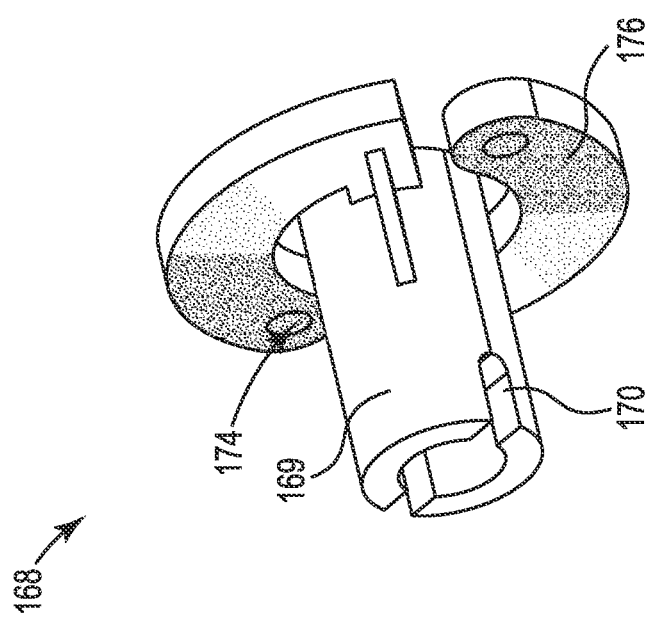
FIG. 35 is a front perspective view of a flexible adapter for use with the control knob assembly of FIG. 34, according to various embodiments.
Figure 37:
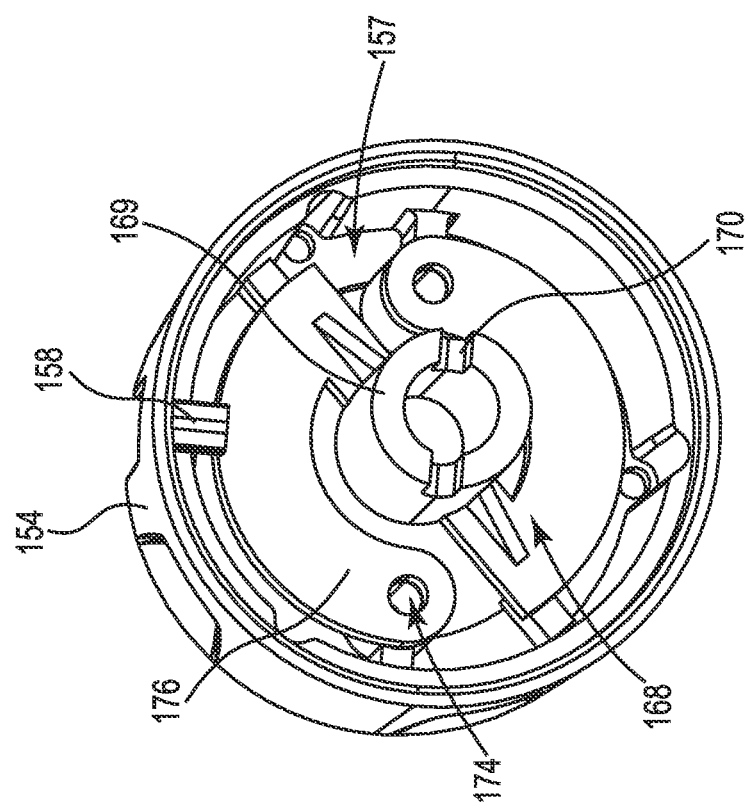
FIG. 37 is a perspective view of selected components of the control knob assembly of FIGS. 31-36, according to various embodiments.

Shown best in FIGS. 35 and 36, flexible arms 176 allow a flexible adapter 168 to flex, tilt, stretch, compress, bend, or the like, particularly axially. The flexible arms 176 as shown can preferably provide a primary flexible feature of the flexible adapter 168. The flex of the flexible adapter 168 along with play or flex at various other connections or components of the control knob assembly 150 allows a desired amount of axial, radial, and/or tilt movement of the knob 154 to allow the protrusions 156, 158 to pass one another with the application of an axial force and tactile user feedback as described in greater detail below. FIG. 37 shows the flexible adapter 168 positioned relative to the knob 154, and in the knob interior 157, as assembled, along with one or more fasteners (not shown) at holes 174.

As shown in FIGS. 35 and 36, the flexible adapter 168 comprises a shaft interface 169 that is preferably attachable to a shaft, and at least one flexible arm 176 (two as shown) each comprising holes 174 for attachment to corresponding holes 155 of the knob 154 (FIG. 37). Feature 170 is preferably configured to interface with and be radially fixed with a rotatably-driven component or control mechanism, such as a shaft 84, as described herein. In alternative embodiments, the shaft interface 169 can include a spline-based connection, such as for an interference or friction fit to a shaft. Therefore, the knob 154 can indirectly control the oven via a rotary shaft as it rotates the flexible adapter 168 and the shaft interface 169 thereof.

The flexible adapter 168 provides an indirect flexible attachment of the knob 154 to the shaft via the one or more flexible arms 176, which preferably provide at least an axial flexibility to the flexible adapter 168 and therefore to the knob 154 and shaft joined by the flexible adapter 168. The flexible adapter 168 therefore provides an indirect output from the knob 154 for rotationally driving various components, such as the control mechanism 62 described above. The flexible adapter 168 can transfer a rotational drive force or torque as received by the knob 154, and allow the knob 154 to be moved axially by the user. FIG. 35 shows the flexible arms 176 in a flexed shape with the shading indicating zones of increased stress to the flexible adapter 168 during such flexing.

The control knob assembly 150 provides a tactile control feedback aspect similar to the control knob assembly 74, described above. However, instead of having one of the directly interacting components with an angled contact surface that can be overcome by reaching a sufficient torque threshold thereby indirectly causing axial and/or tilting, the third embodiment provides an indirect flex component, the flexible adapter 168 which permits rotary movement beyond a hard stop only when the user moves at least one protrusion axially relative to the other as facilitated by the flexible adapter 168. Also like the above embodiment of control knob assembly 74, the knob 154 includes a knob interface portion including a protrusion 158 extending from the knob 154 to engage with an element of the control mechanism interface portion 152, in this case comprising protrusion 156 configured to interface with the protrusion 158 of the control knob 154. However, the engagement surfaces 184 and 159 of the protrusions 156 and 158 of the third embodiment are preferably oriented substantially axial for a hard stop until or unless the user causes an axial flexing of the flexible adapter 168 as described herein.

Referring again to FIG. 34, to move from the off position to the always-on position during operation, the control knob assembly 150 provides a hard stop tactile feature that requires the user to first push in the knob 154. Alternatively embodiments can reverse the orientation of the axial engagement surfaces 184 and 159 and instead require that a user pull out the knob 154, move the knob 154 radially, or tilt the knob 154 to provide clearance around the hard stop feature (engagement surface 184 of protrusion 156, as shown) and between two predominantly axial protrusions (protrusions 156 and 158) and turn to the always-on mode. Yet further embodiments can require the user to tilt the knob 154 in order for engagement surfaces 184 to pass each other and achieve the always-on mode. The knob 154 is therefore pushed in/pulled out or tilted to enable a protrusion 158 of the knob 154 to clear the hard stop of a second protrusion 156 before it can be turned to the always-on mode. As shown with reference to FIGS. 31-40, the knob 154 is preferably moved axially by pushing in (toward the oven housing), where the knob protrusion 154 is moved and positioned underneath the hard stop in the form of protrusion 156 when in the always-on mode.

The user can detect the off position at the hard stop feature through tactile interaction through the knob 154, and can determine that the off position has been reached by detecting the hard stop. The flexible adapter 168 is provided to position the knob 154 relative to a control mechanism interface portion 152 mounted to an oven housing, and/or a rotatably-driven component or shaft. The flexible adapter 168 is provided such that a generally axial movement between two predominantly axial surfaces can be caused by a movement of the knob 154 relative to a shaft, as described above and further described below.

Protrusions 156, 158 prevent further knob turning without an ability to allow an amount of axial and/or radial movement of the protrusions 156, 158 relative to each other via flexible adapter 168. In contrast to certain, e.g., torque-threshold based embodiments described above, movement of the knob 154, such as from the off position to the always-on position described above, can be substantially prevented by the interface of the axial surfaces 184 and 159 the protrusions 156, 158 unless the knob 154 is actuated axially and/or radially by the user. In alternative embodiments, the hard stop aspect of the third embodiment can comprise at least some rotational-torque based threshold tactile feedback to the user, such as by a ramp and/or cam feature, as described in the above embodiments.

Figure 38:
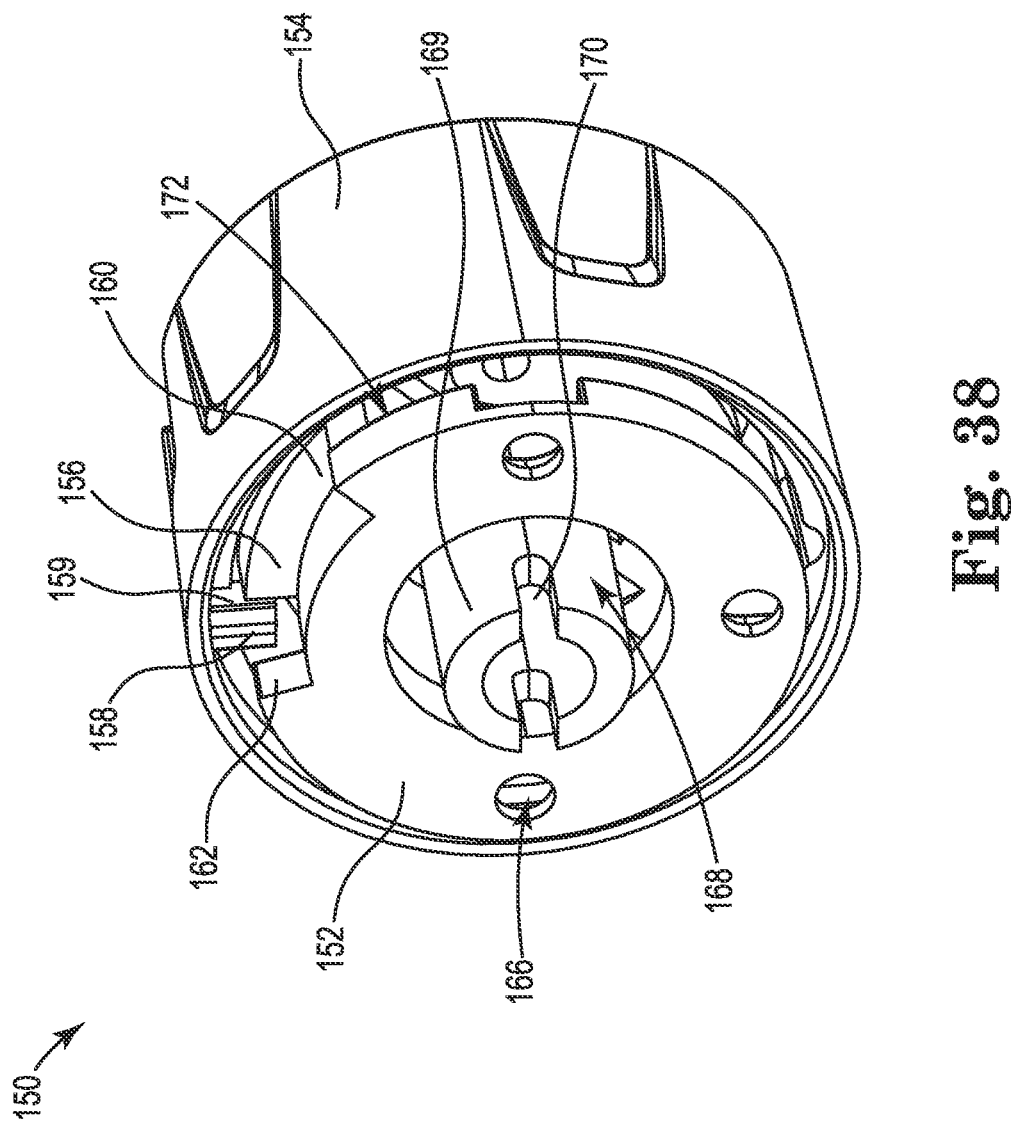
FIG. 38 is a perspective view of a third embodiment of a control knob assembly for use with a heating appliance in a first position, according to various embodiments.
Figure 39:
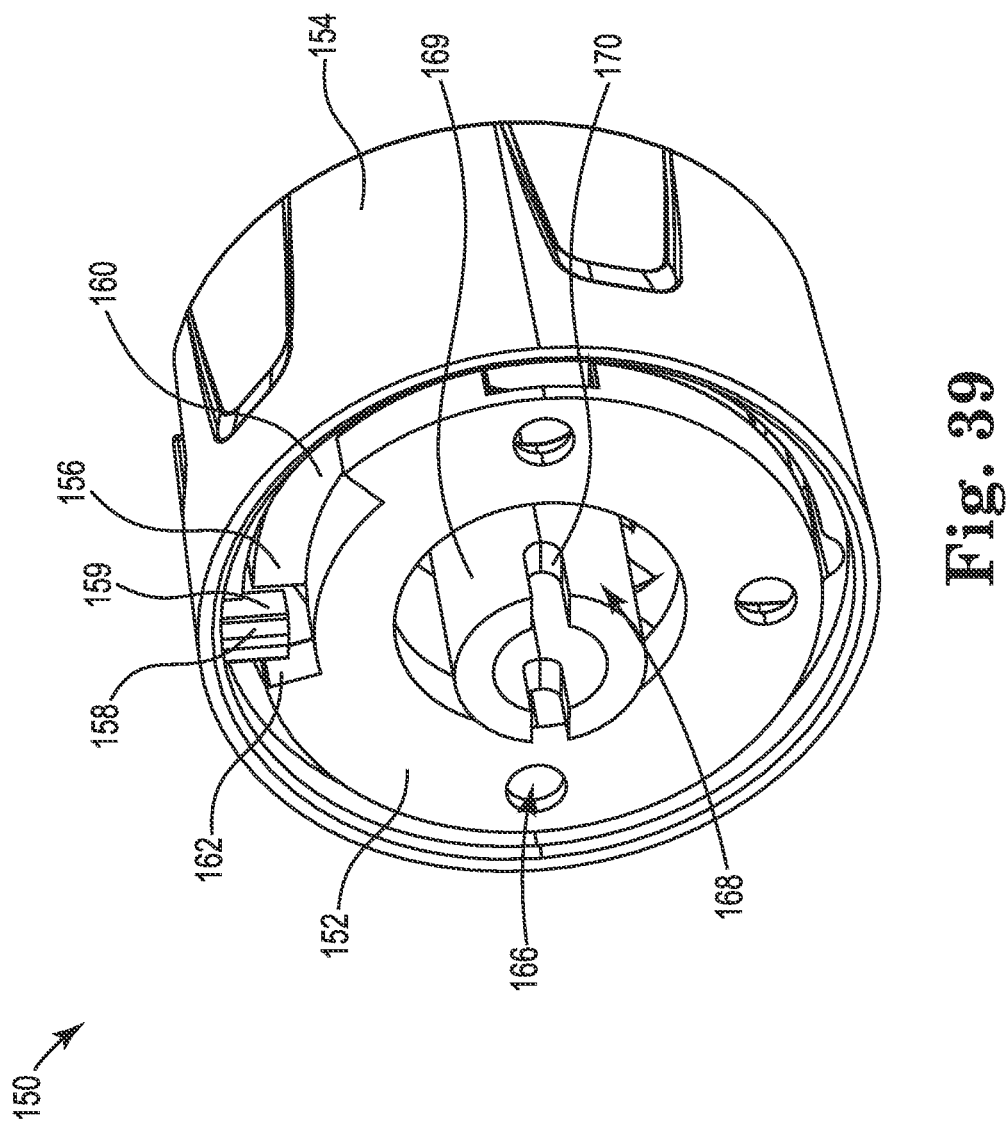
FIG. 39 is a perspective view of the control knob assembly of FIG. 38 in a second position, according to various embodiments
Figure 40:
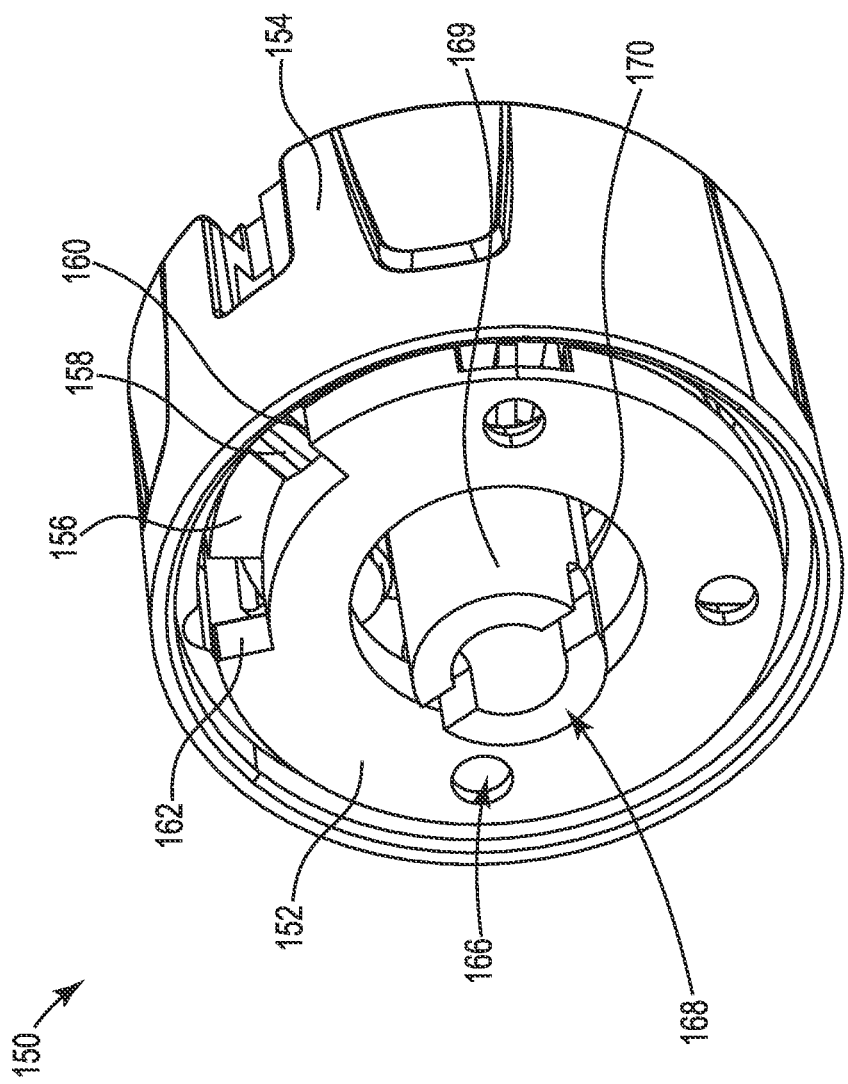
FIG. 40 is a perspective view of the control knob assembly of FIG. 38 in a third position, according to various embodiments.

To further illustrate an example operation of the control knob assembly 150, various example stages of rotation and actuation of the knob 154 of the control knob assembly 150 are shown with reference to FIGS. 38-40. For example, FIGS. 38-40 show three stages in a process in which the user engages an always-on cooking mode from the off position while receiving tactile feedback through the knob 154.

In particular, FIG. 38 shows the control knob assembly 150 from behind the control mechanism interface portion 152 starting in the off position. At this point, the knob 154 has not been moved axially or radially by the user, and thus a gap 172 is shown between the knob 154 and the control mechanism interface portion 152. Note that gap 172 is changed when the knob 154 moves axially as the user selects the always-on cooking mode. FIG. 39 shows the control knob assembly 150 with the knob 154 actuated at least axially (e.g., as the knob 154 is pushed axially by the user), where the protrusion 158 of the knob 154 passes the engagement surface 184 of the protrusion 156 of the control mechanism interface portion 152, for example as the user pushes in toward the housing of the oven. As the user pushes the knob 154 in (or otherwise actuates the knob via axial, radial, and/or tilt movement through tactile interaction), the knob 154 is then able to be rotated toward the always-on position, for instance. FIG. 40 then shows a step following FIG. 39, where the knob 154 is successfully rotated and positioned in the always-on position, and where the protrusion 158 of the knob 154 passes (above or below) the protrusion 156 rides along ramped face 187 and a predominantly axial knob stop surface 159 (see FIGS. 38 and 39) abuts a predominantly axial stop surface 160 of the control mechanism interface portion 152.

In alternative embodiments, various embodiments of the knob and control mechanism interface portion can have various components and/or functionality reversed or otherwise changed without fundamentally altering the nature and principles of operation of presently disclosed embodiments.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A control knob assembly for setting a timing parameter of an appliance, the control knob assembly comprising:
    a control module having a control mechanism including a rotatably driven component that tracks the timing parameter of a first cooking mode from a user set rotational position to a rotationally spaced off position, the control mechanism also defining a rotational position for a second cooking mode, the control module also having a control module interface portion; and
    a control knob having a user manipulation feature so that a user can manipulate the control knob for rotationally setting the timing parameter of the first cooking mode or for selecting the second cooking mode, the control knob also having a knob interface portion;
    wherein one of the control module interface portion and the knob interface portion comprises a first feature and the other of the control module interface portion and the knob interface portion comprises a second feature, and the first and second features are arranged to interact so that the first feature abuts the second feature at the off position and causes a flexible component that is operatively connected with either the first feature or the second feature to flex in order to move the control knob to the second cooking mode.

2. The control knob assembly of claim 1, wherein the first and second features are configured to provide a hard stop at the rotational position for the second cooking mode.

3. The control knob assembly of claim 2, wherein the hard stop provided by the first and second features is configured to be overcome to permit a rotational position at the second cooking position upon receiving an axial movement at the control knob.

4. The control knob assembly of claim 1, wherein the control module interface portion comprises a flexible detent.

5. The control knob assembly of claim 4, wherein the knob interface portion comprises a protrusion that rotates with the control knob.

6. The control knob assembly of claim 1, wherein the knob interface portion comprises a flexible detent that rotates with the control knob.

7. The control knob assembly of claim 6, wherein the control module interface portion comprises a protrusion.

8. The control knob assembly of claim 1, wherein the flexible detent flexes in a radial direction as the protrusion and flexible detent move rotationally relative to each other.

9. The control knob assembly of claim 8, wherein the flexible detent is pressure sensitive and is configured to flex relative to the protrusion by an amount related to a rotational force applied to the control knob.

10. The control knob assembly of claim 1, wherein the control knob is configured to rotate beyond the off position upon receiving a rotational force that exceeds a first force threshold defined by the interaction of the first and second features.

11. The control knob assembly of claim 1, wherein a rotation of the control knob in a first direction increases a set value of the timing parameter, and a rotation of the control knob in a second direction decreases the set value of the timing parameter.

12. The control knob assembly of claim 1, wherein the control module is configured to trigger the second cooking mode upon the control knob rotating beyond the off position.

13. The control knob assembly of claim 1, wherein the second cooking mode is an always-on mode.

14. The control knob assembly of claim 1, wherein the control knob is coupled to the rotatably driven component of the control module via a spline shaft interface.

15. The control knob assembly of claim 14, wherein the control knob is a push-on type.

16. The control knob assembly of claim 1, wherein the first and second features are configured to provide a hard stop at the rotational position for the off position.

17. An appliance comprising the control knob assembly of claim 1.

18. A control knob assembly for setting a timing parameter of an appliance, comprising:
    a control knob having at least a first position indicative feature;
    a control mechanism comprising a second position indicative feature and rotatably interfaced with the control knob to receive an input through a rotation of the control knob; and
    the control knob configured to rotate in a first rotational direction until reaching a first position, and also configured to rotate in a second rotational direction until the first position indicative feature reaches a second position, wherein the control knob can further be rotated in the second direction beyond the second position to a third position when a first rotational force is applied to the control knob in the second rotational direction, wherein the first rotational force exceeds a predetermined force threshold.

19. The control knob assembly of claim 18, wherein one of the position indicative features comprises a flexible detent with an arm portion configured to interface with a protrusion of the other position indicative feature, wherein the arm portion flexes to release a further rotation of the control knob upon the predetermined force threshold being exceeded.

20. The control knob assembly of claim 18, wherein the first position is a maximum timer position, the second position is an off position, and the third position is an always-on position.

21. An appliance comprising the control knob assembly of claim 18.

22. A method, comprising:
    adjusting a knob rotatable in a first direction and a second direction, including in the first direction with a first rotational force, wherein the first direction corresponds to lowering a time setting of an appliance until an off position is reached and the knob resists further rotation in the first direction when the first rotational force is applied to the knob according to a first force threshold;

turning the knob in the first direction with a second rotational force greater than the first rotational force, wherein the second rotational force is sufficient to exceed the first force threshold such that a second cooking mode is triggered when the knob is rotated beyond the off position.

23. The method of claim 22, wherein the second cooking mode is an always-on mode.

24. A control knob assembly for setting a timing parameter of an appliance, the control knob assembly comprising:

a control module having a control mechanism including a rotatably driven component that tracks the timing parameter of a first cooking mode from a user set rotational position to a rotationally spaced off position, the control mechanism also defining a rotational position for a second cooking mode, the control module also having a control module interface portion; and a control knob having a user manipulation feature so that a user can manipulate the control knob for rotationally setting the timing parameter of the first cooking mode or for selecting the second cooking mode, the control knob also having a knob interface portion;

wherein one of the control module interface portion and the knob interface portion comprises a first feature and the other of the control module interface portion and the knob interface portion comprises a second feature, and the first and second features are arranged to interact so that the first feature abuts the second feature at the off position and requires a flexible component that is operatively connected with either the first feature or the second feature to flex in order to move the control knob to the second cooking mode.

* * * * *